US010649897B2

(12) United States Patent
Xu et al.

(10) Patent No.: US 10,649,897 B2
(45) Date of Patent: *May 12, 2020

(54) ACCESS REQUEST PROCESSING METHOD AND APPARATUS, AND COMPUTER DEVICE

(71) Applicant: HUAWEI TECHNOLOGIES CO., LTD., Shenzhen, Guangdong (CN)

(72) Inventors: Jun Xu, Hangzhou (CN); Qun Yu, Beijing (CN); Yuangang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

This patent is subject to a terminal disclaimer.

(21) Appl. No.: 16/021,555

(22) Filed: Jun. 28, 2018

(65) Prior Publication Data

US 2018/0307602 A1 Oct. 25, 2018

Related U.S. Application Data

(63) Continuation of application No. PCT/CN2015/099933, filed on Dec. 30, 2015.

(51) Int. Cl.
*G06F 12/00* (2006.01)
*G06F 11/00* (2006.01)
*G06F 12/0804* (2016.01)
*G06F 11/16* (2006.01)
*G06F 12/0868* (2016.01)
(Continued)

(52) U.S. Cl.
CPC ...... *G06F 12/0804* (2013.01); *G06F 11/1448* (2013.01); *G06F 11/1471* (2013.01);
(Continued)

(58) Field of Classification Search
None
See application file for complete search history.

(56) References Cited

U.S. PATENT DOCUMENTS 5,893,140 A * 4/1999 Vahalia ............... G06F 11/1435
711/118
2006/0184719 A1 8/2006 Sinclair
(Continued)

FOREIGN PATENT DOCUMENTS

CN 101903866 A 12/2010
CN 103838676 A 6/2014
(Continued)

OTHER PUBLICATIONS

Xiao Jing Hua et al.Principles of computer operating system: Linux example analysis, 2008. with english abstract. total 5 pages.

*Primary Examiner* — David Yi
*Assistant Examiner* — Craig S Goldschmidt

(57) ABSTRACT

An access request processing method and apparatus, and a computer device are disclosed. The computer device includes a processor, a dynamic random-access memory (DRAM), and a non-volatile memory (NVM). When receiving a write request, the processor may identify an object cache page according to the write request. The processor obtains the to-be-written data from a buffer according to a buffer pointer in the write request, the to-be-written data including a new data chunk to be written into the object cache page. The processor then inserts a new data node into a log chain of the object cache page, where the NVM stores data representing the log chain of the object cache page. The new data node includes information regarding the new data chunk of the object cache page. The computer device provided in this application can reduce system overheads while protecting data consistency.

13 Claims, 9 Drawing Sheets

(51) Int. Cl.
*G06F 12/02* (2006.01)
*G06F 11/14* (2006.01)

(52) U.S. Cl.
CPC ...... *G06F 11/1612* (2013.01); *G06F 12/0246* (2013.01); *G06F 12/0868* (2013.01); *G06F 11/1441* (2013.01); *G06F 2212/1032* (2013.01); *G06F 2212/7203* (2013.01); *G06F 2212/7207* (2013.01); *G06F 2212/7209* (2013.01)

(56) References Cited

U.S. PATENT DOCUMENTS

| | | |
|---|---|---|
| 2009/0049234 A1 | 2/2009 | Oh et al. |
| 2009/0150599 A1 | 6/2009 | Bennett |
| 2011/0185107 A1* | 7/2011 | Yano ............... G06F 12/0246 |
| | | 711/103 |
| 2012/0239869 A1 | 9/2012 | Chiueh et al. |
| 2012/0254120 A1 | 10/2012 | Fang et al. |
| 2013/0138873 A1 | 5/2013 | Gorobets et al. |
| 2013/0166855 A1 | 6/2013 | Batwara et al. |
| 2015/0052295 A1 | 2/2015 | Danilak et al. |
| 2015/0261673 A1 | 9/2015 | Wei et al. |
| 2018/0300236 A1* | 10/2018 | Xu ..................... G06F 12/0866 |

FOREIGN PATENT DOCUMENTS

| | | |
|---|---|---|
| CN | 103955528 A | 7/2014 |
| CN | 105159818 A | 12/2015 |
| EP | 2309392 A1 | 4/2011 |
| WO | 2011090500 A1 | 7/2011 |

* cited by examiner

ACCESS REQUEST PROCESSING METHOD AND APPARATUS, AND COMPUTER DEVICE

CROSS-REFERENCE TO RELATED APPLICATIONS

This application is a continuation of International Application No. PCT/CN2015/099933, which is titled by "ACCESS REQUEST PROCESSING METHOD AND APPARATUS, AND COMPUTER SYSTEM" and filed on Dec. 30, 2015, the disclosure of which is hereby incorporated by reference in its entirety.

TECHNICAL FIELD

The present disclosure relates to the field of storage technologies, and in particular, to an access request processing method and apparatus, and a computer system.

BACKGROUND

In a storage system, data consistency is usually retained in a write-ahead logging (WAL) manner. According to this manner, all data to be written to the storage system is first written to a log file of an external storage device (for example, a magnetic disk), and previous data is subsequently updated according to the log file. When a fault such as a power failure or a breakdown occurs in the system, data can be restored according to a log, thereby ensuring data consistency. With development of a next-generation non-volatile memory (NVM) technology, the next-generation NVM has relatively fast reading and writing speeds and is byte addressable, and therefore can be used as a system memory. Such a storage class memory (SCM) using the NVM as a medium features non-volatility, and provides a new method for data consistency protection in the storage system.

In a method for implementing data consistency based on an SCM in the prior art, a cache and a log share storage space of the SCM. In this implementation, an SCM block may be used as both a cache block and a log block. In the SCM, a block is used as a basic unit of storage space. Generally, a size of a block may be 4K bytes. Each block has three state pairs: frozen/normal, dirty/clean, and up-to-date/out-of-date. "frozen" is used to indicate that the block is a log block, that is, data in the block may be used as a log. "normal" is used to indicate that the block is a cache block, that is, the block is used as a cache. "dirty" is used to indicate that data stored in the block has been modified. "clean" is used to indicate that data stored in the block has not been modified. "up-to-date" is used to indicate that data stored in the block is a latest version. "out-of-date" is used to indicate that data stored in the block is an earlier version. In a data update process, first, a block is allocated to data in the memory, and a state of the block is recorded as (normal, clean, up-to-date). After the data is written to the block, the state of the block is updated to (normal, dirty, up-to-date). The block in the (normal, dirty, up-to-date) state can be directly read or written, that is, data can be directly read from the block in the (normal, dirty, up-to-date) state or data can be directly written to the block in the (normal, dirty, up-to-date) state. After the current write operation is completed, during transaction submission, the memory block is used as a log block, and the state of the memory block is modified to (frozen, dirty, up-to-date). When new data is subsequently written to the memory block, the state of the memory block is modified to (frozen, dirty, out-of-date). The memory block in the (frozen, dirty, out-of-date) state may be written back to a magnetic disk. After the memory block is written back to the magnetic disk, the memory block becomes a free block (free block) and can be used for a new write operation. Compared with the WAL manner, the method of using the SCM as both cache space and log space reduces data write operations. However, states of blocks need to be maintained, leading to relatively high system overheads. In addition, in this manner, data needs to be updated at a granularity of a block, and when data to be updated is smaller than a block, a write amplification problem is caused. Consequently, data actually written to the magnetic disk is more than data needing to be written to the magnetic disk.

SUMMARY

Embodiments of this application provide an access request processing method and apparatus, and a computer system, to reduce system overheads while protecting data consistency.

According to a first aspect, this application provides an access request processing method. The method may be performed by a computer system. The computer system includes a processor and a non-volatile memory (NVM). In the computer system, when the processor receives a write request carrying a file identifier, a buffer pointer, a size of to-be-written data, the processor may obtain an access location according to the file identifier carried in the write request. The buffer pointer is used to point to a buffer for caching the to-be-written data, the to-be-written data is modified data for an object file to be accessed by the write request, and the access location indicates a start address for writing data to the object file by the write request. Further, the processor may determine an object cache page according to the access location, the size of the to-be-written data, and a size of a cache page. The object cache page is a memory page that is in the memory and that is used to cache file data, to be modified by the to-be-written data, in the object file. After determining that the NVM stores a log chain of the object cache page, the processor inserts a new data node into the log chain of the object cache page. Each data node in the log chain of the object cache page includes information about modified data of the object cache page in one modification process. The inserted data node includes information about a log data chunk of the object cache page, and the information about the log data chunk includes the log data chunk or a storage address of the log data chunk in the NVM. The log data chunk is modified data of the object cache page, and the log data chunk is at least one part of to-be-written data obtained from the buffer according to the buffer pointer.

In the access request processing method provided in this application, when the processor needs to modify data in a file according to the access request, the processor does not directly write modified data to an object cache page of the file, but writes the modified data to storage space of the NVM, and records, using a log chain, information that is about modified data of the object cache page in each modification process. Because the NVM is non-volatile, and written data is stored in the NVM in a recording manner using the log chain, the modified data of the object cache page in multiple modification processes can be recorded in a chronological order, thereby facilitating identification of a version relationship between log data chunks, and ensuring consistency between stored data and the written data. When the access request processing method provided in this application is compared with the prior art in which different states of a memory block are maintained to retain data consistency, because state maintenance brings higher system overheads than a write update process, when being used, the access request processing method provided in this application can reduce system overheads of the computer system in an access request processing process. In addition, in the access request processing method provided in this application, a size of a log data chunk can be less than that of a page, and therefore, the access request processing method provided in this application can support file modification at a granularity smaller than a page, implementing a more flexible modification manner.

Further, in the access request processing method provided in this application, after the processor writes the to-be-written data to the NVM according to the write request, the processor may respond to an application with a write success message. The write success message is used to indicate that the to-be-written data is successfully written to a storage device. In this way, an access request processing delay can be reduced.

In a possible implementation, in a process of determining that the NVM stores the log chain of the object cache page, the processor may specifically determine, according to at least one of the following fields in a cache page structure of the object cache page, that the NVM stores the log chain of the object cache page: "log head", "log tail", "logs", or "log dirty". The "log head" field is used to point to the first address of the log chain of the object cache page, the "log tail" field is used to point to the first address of the last data node in the log chain of the object cache page, the "logs" field is used to indicate a quantity of data nodes in the log chain of the object cache page, and the "log dirty" field is used to indicate whether the object cache page is synchronized with a log data chunk indicated by a data node in the log chain of the object cache page.

In a possible implementation, when the processor determines that the NVM stores no log chain of the object cache page, the processor may create a log chain for the object cache page in the NVM. In this way, the processor can insert a data node into the newly created log chain, and record, in the inserted data node, information about a log data chunk of the object cache page.

In a possible implementation, in the process of performing the operation of inserting the new data node into the log chain of the object cache page, the processor may insert the new data node at a tail or a head of the log chain of the object cache page. After the new data node is inserted, the log chain of the object cache page includes at least two data nodes that are sequentially linked according to an update order of the object cache page. The new data node is inserted according to this order, so that log data chunks in different data nodes in the log chain of the object cache page can be linked according to a chronological order of update versions of the object cache page. In this way, different update versions of the object cache page can be identified according to an order of the data nodes in the log chain of the object cache page. In a data reading process, valid data can be determined according to log data chunks in different data nodes in a same log chain of a cache page, thereby ensuring correctness of read data.

In a possible implementation, the processor may further obtain an updated object cache page according to information that is about at least one log data chunk and that is recorded in the log chain of the object cache page, and store data of the updated object cache page in an external storage device of the computer system. According to this manner, file data in a magnetic disk can be updated, thereby retaining data consistency. In addition, in the access request processing method provided in this application, after the data is written to the NVM, the modified data in the NVM does not need to be immediately written to an external storage of the computer system. Instead, when storage space of the NVM needs to be reclaimed or data of the computer system is restored, a log data chunk stored in the NVM is updated to a corresponding cache page, and file data in the magnetic disk is updated according to an updated cache page. Compared with an existing write-ahead logging (WAL) manner and copy on write manner for retaining data consistency, in this manner, the modified data is merged into the object cache page, and then the object cache page obtained after merging is written to the magnetic disk, so that write amplification of the system can be reduced.

In a possible implementation, the obtaining an updated object cache page according to information that is about at least one log data chunk and that is recorded in the log chain of the object cache page includes: determining valid data in the log chain of the object cache page according to the information that is about the at least one log data chunk and that is recorded in the log chain of the object cache page, and updating the valid data to the object cache page, to obtain the updated object cache page. The valid data is latest modified data of the object cache page. For example, the processor may determine the valid data in the log chain according to an update order of data nodes in the log chain of the object cache page and information about an intra-page location of a log data chunk. The information about the intra-page location of the log data chunk may be obtained according to two pieces of information: an "intra-page offset" and a "data length" in a data node.

In a possible implementation, the processor may further reclaim the log chain of the object cache page after storing the data of the updated object cache page in the external storage device of the computer system. In this way, storage space of the NVM can be reclaimed, thereby saving system resources.

In a possible implementation, the information about the log data chunk further includes: information about an intra-page location of the log data chunk and address information of an adjacent data node of the inserted data node. The intra-page location of the log data chunk is a location of the log data chunk in the object cache page, and the information about the intra-page location of the log data chunk may include information such as an intra-page offset and a log data length. The intra-page offset is used to indicate a start location of the log data chunk in the object cache page, and the log data length is used to indicate a length of the log data chunk. The address information of the adjacent data node of the inserted data node may be obtained according to information about a "previous log address" and a "next log address" in the data node. The "previous log address" is used to indicate a start address of a previous data node in the NVM, and the "next log address" is used to indicate a start address of a next data node in the NVM. According to the information about the log data chunk, the latest modified data of the object cache page can be determined, and an update order of data nodes can be obtained, so that different update versions of the object cache page can be determined according to information recorded in the data nodes in the log chain of the object cache page.

According to a second aspect, this application provides another access request processing method. The method may also be performed by a computer system. The computer system includes a processor and a non-volatile memory (NVM). In the computer system, after the processor receives a read request carrying a file identifier and a size of to-be-read data, the processor may obtain an access location according to the file identifier. The access location indicates a start address for reading data from an object file by the read request. Further, the processor may determine, according to the access location, the size of the to-be-read data, and a size of a cache page, an object cache page and location information of the to-be-read data in the object cache page. The object cache page is a memory page that is in the memory and that is used to cache file data, to be modified by to-be-written data, in the object file. After determining that the NVM stores a log chain of the object cache page, the processor may obtain an updated object cache page according to the object cache page and information that is about at least one log data chunk and that is in the log chain of the object cache page. The log chain of the object cache page includes the information about the at least one log data chunk, each log data chunk is modified data of the object cache page in one modification process, and the information about the log data chunk includes the log data chunk or a storage address of the log data chunk in the NVM. Then the processor may read data from the updated object cache page according to the location information of the to-be-read data in the object cache page.

In the access request processing method provided in this application, because modified data of the cache page is stored in the NVM using the log chain, data modification at a granularity smaller than a page can be supported. In a process of processing the read request, a latest modification version of the object cache page can be obtained according to a log data chunk in a data node in the log chain of the object cache page to be accessed by the read request, thereby ensuring correctness of read data.

In a possible implementation, the obtaining an updated object cache page according to the object cache page and information that is about at least one log data chunk and that is in the log chain of the object cache page includes: determining valid data in the log chain of the object cache page according to the information that is about the at least one log data chunk and that is recorded in the log chain of the object cache page, and updating the valid data to the object cache page, to obtain the updated object cache page. The valid data is latest modified data of the object cache page. For example, the processor may determine the valid data in the log chain according to an update order of data nodes in the log chain of the object cache page and information about an intra-page location of a log data chunk. The information about the intra-page location of the log data chunk may be obtained according to two pieces of information: an "intra-page offset" and a "data length" in a data node.

In a possible implementation, in a process of determining that the NVM stores the log chain of the object cache page, the processor may specifically determine, according to at least one of the following fields in a cache page structure of the object cache page, that the NVM stores the log chain of the object cache page: "log head", "log tail", "logs", or "log dirty". The "log head" field is used to point to the first address of the log chain of the object cache page, the "log tail" field is used to point to the first address of the last data node in the log chain of the object cache page, the "logs" field is used to indicate a quantity of data nodes in the log chain of the object cache page, and the "log dirty" field is used to indicate whether the object cache page is synchronized with a log data chunk indicated by a data node in the log chain of the object cache page.

In another possible implementation, the information about the log data chunk further includes: information about an intra-page location of the log data chunk and address information of an adjacent data node of a data node comprising the log data chunk. The intra-page location of the log data chunk is a location of the log data chunk in the object cache page, and the information about the intra-page location of the log data chunk may include information such as an intra-page offset and a log data length. The intra-page offset is used to indicate a start location of the log data chunk in the object cache page, and the log data length is used to indicate a length of the log data chunk. The address information of the adjacent data node of the inserted data node may be obtained according to information about a "previous log address" and a "next log address" in the data node. The "previous log address" is used to indicate a start address of a previous data node in the NVM, and the "next log address" is used to indicate a start address of a next data node in the NVM. According to the information about the log data chunk, the latest modified data of the object cache page can be determined, and an update order of data nodes can be obtained, so that different update versions of the object cache page can be determined according to information recorded in the data nodes in the log chain of the object cache page.

According to a third aspect, this application provides a computer system. The computer system includes a non-volatile memory NVM and a processor connected to the NVM, and the processor is configured to perform the method according to the first aspect and the possible implementations of the first aspect.

According to a fourth aspect, this application provides a computer system. The computer system includes a non-volatile memory (NVM) and a processor connected to the NVM, and the processor is configured to perform the method according to the second aspect and the possible implementations of the second aspect.

According to a fifth aspect, this application provides an access request processing apparatus. The access request processing apparatus is applied to a computer system, the computer system includes a non-volatile memory (NVM), and the access request processing apparatus includes modules configured to perform the method according to the first aspect and the possible implementations of the first aspect.

According to a sixth aspect, this application provides an access request processing apparatus. The access request processing apparatus is applied to a computer system, the computer system includes a non-volatile memory (NVM), and the access request processing apparatus includes modules configured to perform the method according to the second aspect and the possible implementations of the second aspect.

According to a seventh aspect, this application provides a computer program product, including a computer readable storage medium storing program code. An instruction included in the program code is used to perform at least one of the methods according to the first aspect and the second aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings described below are only some embodiments of the present disclosure.

DESCRIPTION OF EMBODIMENTS

To make a person skilled in the art understand the technical solutions in the present disclosure better, the following describes the technical solutions in the embodiments of the present disclosure with reference to the accompanying drawings in the embodiments of the present disclosure. Apparently, the described embodiments are only some rather than all of the embodiments of the present disclosure.

Figure 1:
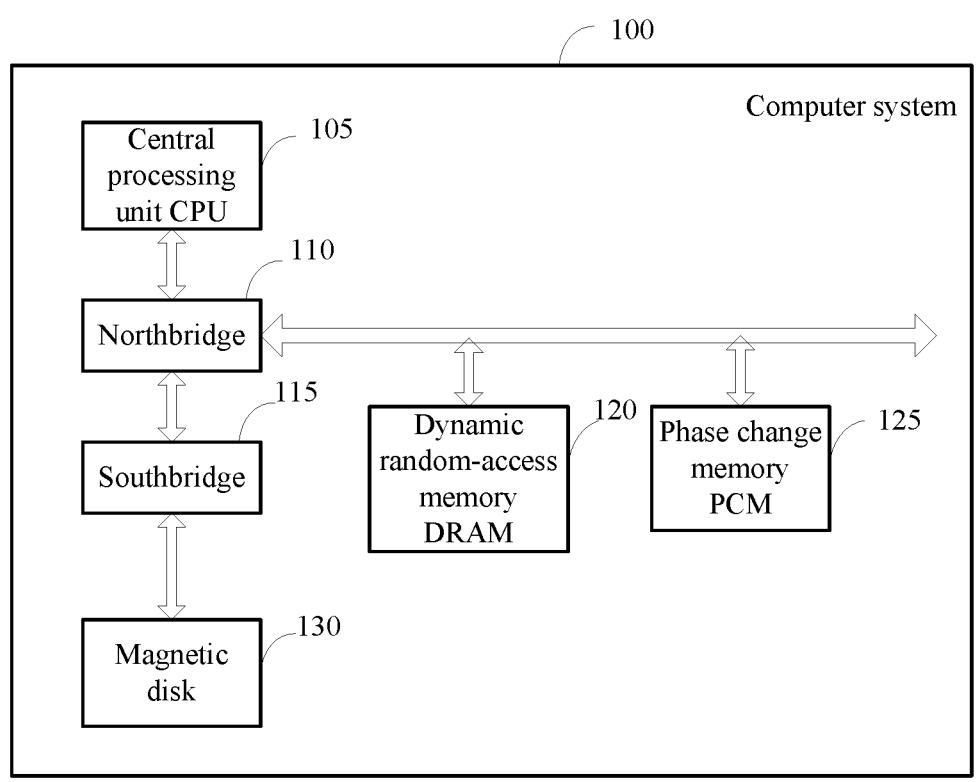
FIG. 1 is a schematic architectural diagram of a computer system according to an embodiment of the present disclosure.

FIG. 1 is a schematic architectural diagram of a computer system according to an embodiment of the present disclosure. A computer system architecture shown in FIG. 1 is a computer system architecture with a hybrid memory. In the computer system architecture shown in FIG. 1, a dynamic random-access memory (DRAM) and a phase change memory (PCM) are jointly used as a memory. As shown in FIG. 1, a computer system 100 may include: a central processing unit (CPU) 105, a northbridge 110, a southbridge 115, a dynamic random-access memory DRAM 120, a phase change memory PCM 125, and a magnetic disk 130.

The central processing unit (CPU) 105 is a core of the computer system, and the CPU 105 can invoke different software programs in the computer system 100 to implement different functions. For example, the CPU 105 can access the DRAM 120, the PCM 125, and the magnetic disk 130. It can be understood that, in this embodiment of the present disclosure, the CPU 105 is merely an example of a processor. In addition to the CPU 105, the processor may be another application-specific integrated circuit (ASIC), or one or more integrated circuits that are configured to implement this embodiment of the present disclosure.

The northbridge 110 is usually configured to process a high speed signal in the computer system 100. Specifically, the northbridge 110 may be configured to process communication between the CPU, the memory, and the southbridge. The northbridge 110 is connected to the CPU 105 using a front side bus. The northbridge 110 is connected to the DRAM 120 and the PCM 125 using a memory bus. According to this manner, the DRAM 120 and the PCM 125 are both connected to the memory bus, and communicate with the CPU 105 using the northbridge 110. A person skilled in the art can understand that, the northbridge 110 may be integrated with the CPU 105.

The southbridge 115 is responsible for communication between the CPU 105 and an external device. The CPU 105 may communicate with the southbridge 115 using a communications bus such as a peripheral component interconnect express (PCI-E) bus or a direct media interface (DMI) bus, to control devices such as a peripheral component interconnect (PCI) interface device, a universal serial bus (USB) interface device, and a Serial ATA (SATA) interface device. For example, the southbridge 115 may be connected to the magnetic disk 130 using a Serial ATA (SATA) interface, so that the CPU 105 can communicate with the magnetic disk 130 using the southbridge 115, to control the magnetic disk 130. In this embodiment of the present disclosure, the southbridge includes but is not limited to an integrated southbridge, such as a Platform Controller Hub (PCH).

The dynamic random-access memory (DRAM) 120 is connected to the northbridge 110 using the memory bus. The DRAM 120 may communicate with the CPU 105 using the northbridge 110. The CPU 105 can access the DRAM 120 at a high speed, and perform a read or write operation on any storage unit in the DRAM 120. The DRAM 120 has an advantage of a fast access speed, and therefore, the DRAM is usually used as a main memory. Usually, the DRAM 120 is used to store various software currently running on an operating system, input and output data, information that is exchanged with an external storage, and the like. However, the DRAM 120 is volatile. When a computer is powered off, the information in the DRAM 120 is no longer stored. A person skilled in the art knows that, the DRAM is one of volatile memories, and during actual application, another random-access memory (RAM) may be used as the memory of the computer system. For example, a static random-access memory (SRAM) may be used as the memory of the computer system.

The PCM 125 is a new type of non-volatile memory (Non-Volatile Memory, NVM). In this embodiment of the present disclosure, the PCM 125 and the DRAM 120 are jointly used as the memory of the computer system 100. Because the new type of NVM is byte addressable, and data is written to the non-volatile memory on a per-bit basis, the PCM 125 can be used as the memory. Compared with the DRAM 120, the PCM 125 features non-volatility, and therefore can store data better. In this embodiment of the present disclosure, the non-volatile memory that can be used as the memory may be referred to as a storage class memory (SCM). It should be noted that, in this embodiment of the present disclosure, the PCM 125 shown in FIG. 1 is merely an example of the SCM. In addition to the PCM, the SCM may include: another new type of non-volatile memory such as a resistive random-access memory (RRAM), a magnetic random-access memory (MRAM), or a ferroelectric random-access memory (FRAM). A specific type of the SCM in this embodiment of the present disclosure is not limited herein.

The magnetic disk 130 may be connected to the southbridge 115 using an interface such as the Serial Advanced Technology Attachment (SATA) interface or a small computer system interface (SCSI). The magnetic disk 130 is configured to store data and is used as an external storage device of the computer system 100. Usually, a storage medium used as the external storage device needs to feature non-volatility, and when the computer is powered off, data stored in the external storage still exists. In addition, the external storage has a relatively large storage capacity. It can be understood that, the magnetic disk 130 is merely an example of the external storage device. In addition to the magnetic disk 130, a storage used as the external storage device may be another non-volatile storage device that can store data, such as a solid state drive (SSD), a hard disk drive (HDD), an optical disc, or a storage array.

It can be understood that, the computer system shown in FIG. 1 is merely an example of a computer system. During actual application, with development of computer technologies, in a new-generation computer system, the CPU 105 may not be connected to the memory using the northbridge, and the DRAM 120 and the PCM 125 may communicate with the CPU 105 using a double data rate (DDR) bus. In addition, the CPU 105 may not be connected to the magnetic disk 130 using the southbridge. For example, the CPU 105 may be connected to the magnetic disk 130 using a host bus adapter (HBA). In this embodiment of the present disclosure, a connection form between components in the computer system is not specifically limited, provided that the computer system includes a non-volatile memory (NVM). In other words, the computer system in this embodiment of the present disclosure is a computer system including a persistent memory (PM).

Figure 2:
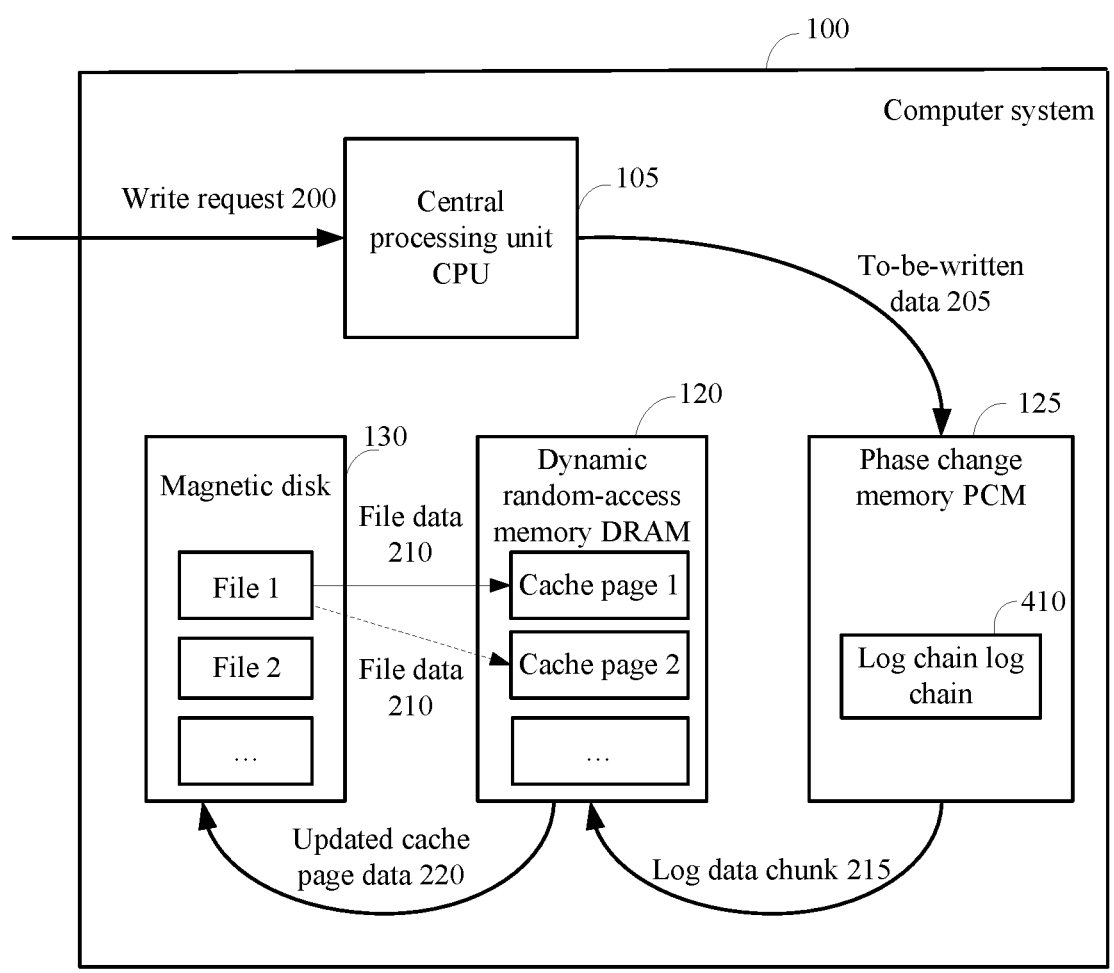
FIG. 2 is a schematic signaling diagram of a computer system according to an embodiment of the present disclosure.
Figure 3:
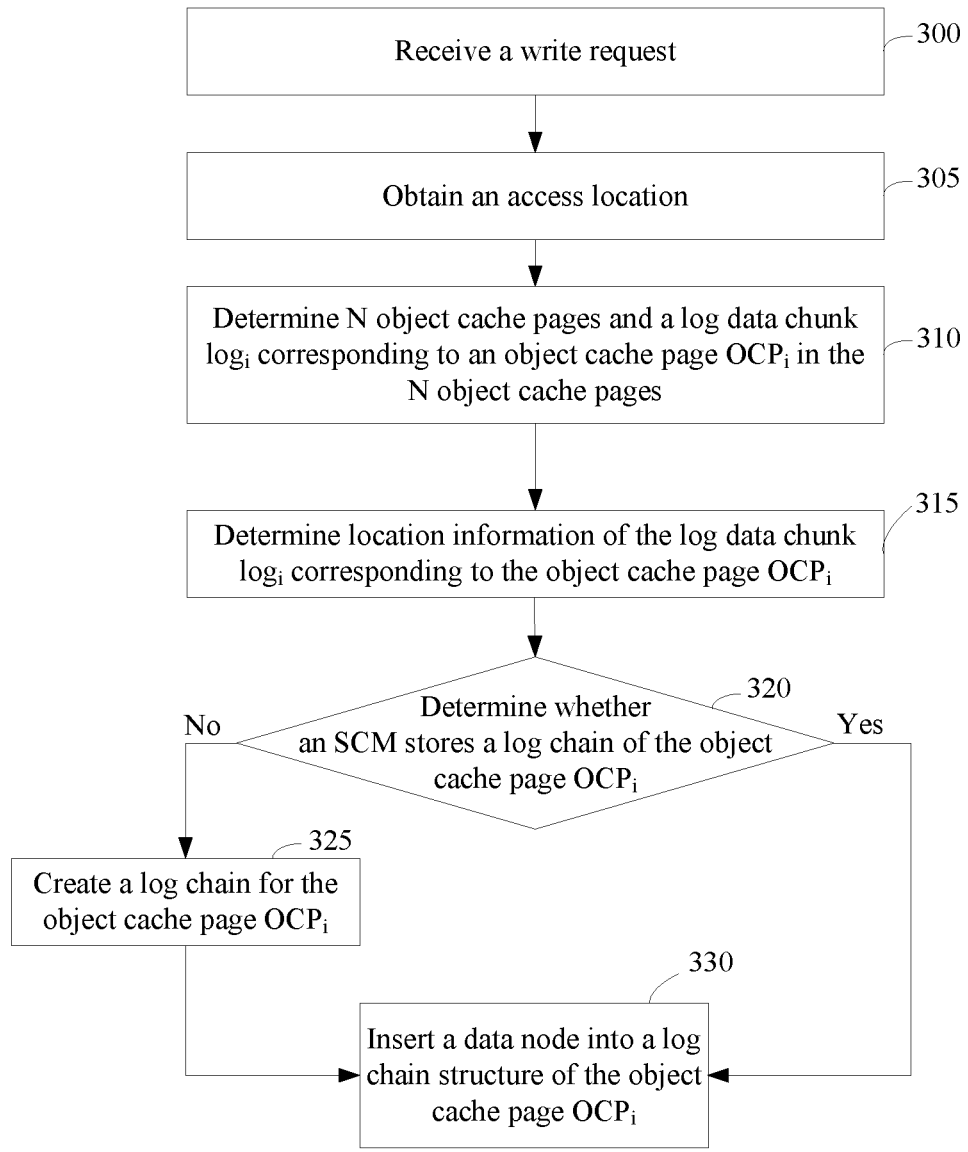
FIG. 3 is a flowchart of an access request processing method according to an embodiment of the present disclosure.

In the computer system shown in FIG. 1, to ensure that written data is not lost even if a power failure, a breakdown, a software fault, or the like occurs in the computer system 100, and to protect data consistency, in this embodiment of the present disclosure, data consistency may be retained using a log chain created in the SCM. The following describes, in detail with reference to FIG. 2 and FIG. 3, how the computer system 100 shown in FIG. 1 reduces system overheads while retaining data consistency. FIG. 2 is a schematic signaling diagram of a computer system 100 according to an embodiment of the present disclosure. FIG. 3 shows an access request processing method according to an embodiment of the present disclosure. In addition, for convenience of description, FIG. 2 shows only components that are in the computer system 100 shown in FIG. 1 and that participate in an access request processing process. FIG. 3 shows an example in which the computer system 100 processes a write request. It should be noted that, the CPU 105 processes an access request by invoking data processing logic (not shown in FIG. 2). It can be understood that, the data processing logic may be a program for implementing the request processing method in this embodiment of the present disclosure.

A person skilled in the art may know that, a file system is a software structure responsible for file information management and storage in the operating system. From the perspective of a system, the file system is used to organize and allocate space of a file storage device and is responsible for storing files, and protecting and retrieving the stored files. The file system includes three parts: an interface of the file system, a set of software for manipulating and managing files, and file data and attributes. When a process reads a file or writes a file, the operating system first opens, according to a file name, an object file to be accessed by the process, and then performs a read operation or a write operation on the opened object file according to a received read request or write request. The file name may be a full path name of the file, and is a logical description of location information of the object file in the magnetic disk. For example, the file name of the object file may be: D:\FILE\file1. In a process of opening the file according to the full path name of the file, it is required to perform searching layer by layer according to the full path of the file, continuously perform write operations on the magnetic disk, and create a corresponding data structure in the memory to indicate a directory structure of the object file. After the file is opened, in a process of accessing the object file according to the read request or the write request, if the read operation or the write operation is still performed according to the full path name of the object file, frequent read or write operations are performed on the magnetic disk, resulting in a relatively complex process and a relatively long processing time. Therefore, during actual application, when the operating system opens the object file, the operating system allocates a file handle to the object file accessed by the process, and maintains a file handle array inside the process. The file handle may be represented using a number. For example, the file handle may be: fd0, fd1, or fd2. The file handle array stores a pointer pointing to file description information. The file description information includes a pointer pointing to information such as a file directory structure, metadata, and an access location. The file directory structure is used to describe a logical location of the file, the file directory structure is stored in the memory, and the process can find a location of the object file using the file directory structure. The metadata is data used to describe file data. Specifically, the metadata includes information about an organization and a data field of the file data, and a relationship between the organization and the data field. The access location is used to indicate a start location currently accessed by the process. The access location may be a logical location. Usually, access location information may be 0, used to indicate that access starts from a start address of the file. Alternatively, in a process of opening the file, the file access location may be set to another location other than 0 by means of a system call. Alternatively, in a process of accessing the file (reading/writing the file), the process may set the file access location according to the file handle by means of a system call. A person in the art knows that, in a case of random reading or writing, the access location may be any access location that is set by means of a system call, and in a case of sequential reading or writing, the access location that is currently accessed is an end location that is previously accessed. In a process of performing the read operation or the write operation on the object file, the process may search the file handle array maintained by the process for description information of the object file according to the file handle of the object file. Information such as the metadata and the access location of the file is found in the file description information, to perform the read operation or the write operation on the object file. It can be understood that, the file handle is a file identifier used by the current process to identify the object file in a process of reading/writing the object file. In this embodiment of the present disclosure, the file identifier may be another file descriptor other than the file handle, and is not limited herein, provided that the process can identify the object file according to the file identifier and find the description information of the object file.

As described above, because the memory has an advantage of a fast access speed, the memory (for example, the DRAM 120 and the PCM 125 that are shown in FIG. 1) may be used to store various software currently running on the operating system, input and output data, and information that is exchanged with the external storage. Therefore, when the object file is accessed, the operating system running in the computer system 100 first loads the file data of the to-be-accessed object file from the magnetic disk 130 into the memory. In this embodiment of the present disclosure, a memory page that is in the memory and that is used to cache the file data may be referred to as a cache page. For convenience of description, the following describes an example in which the file data of the object file is loaded into the DRAM 120. For example, as shown in FIG. 2, a "cache page 1" and a "cache page 2" in the DRAM 120 are both used to cache file data 210 of a "file 1". Therefore, the "cache page 1" and the "cache page 2" are both cache pages of the "file 1" stored in the magnetic disk 130. It can be understood that, different cache pages cache different file data. Generally, a size of a page is 4K bytes, that is, one page has 4096 bytes. In this embodiment of the present disclosure, generally, a size of a cache page is also 4K bytes. During actual application, the size of the cache page may alternatively be set to 8 KB or 16 KB. The size of the cache page is not limited herein.

The access request processing process provided in this embodiment of the present disclosure mainly includes a process of respectively performing a write operation and a read operation on an object file according to a write request and a read request of the object file after the object file is opened. As shown in FIG. 2 and step 300 in FIG. 3, when the CPU 105 receives a write request 200, the CPU 105 may invoke data processing logic 1051 to process the write request 200. The write request 200 carries a file identifier, a buffer pointer, and a size of to-be-written data. The file identifier is a file handle allocated by a process to an object file when the process opens the object file to be accessed by the write request 200. The process can find file description information of the object file according to the file identifier. The buffer pointer is used to point to a buffer for caching the to-be-written data. A person skilled in the art may know that, the buffer may be a section of storage space divided from the DRAM 120 or the PCM 125. The size of the to-be-written data is a length of the buffer for caching the to-be-written data. For example, the size of the to-be-written data may be 100 bytes.

In step 305, the CPU 105 obtains an access location according to the file identifier. The access location is used to indicate a start address for writing data to the object file by the write request 200. In this embodiment of the present disclosure, after the CPU 105 receives the write request 200, the CPU 105 may use the file identifier carried in the write request 200 as an index, to find the description information of the object file using a file handle array maintained by the process, and search the description information of the object file for the access location of the object file to be accessed by the write request 200. The access location is the start address for writing the data to the object file by the write request 200. In this embodiment of the present disclosure, the access location may be a logical access location. For example, the access location may be the $89^{th}$ byte of a first file.

In step 310, the CPU 105 determines, according to the access location, the size of the to-be-written data, and the size of the cache page, N object cache pages and a log data chunk $\log_i(x, y)$ corresponding to an object cache page $OCP_i$ in the N object cache pages. A value of i ranges from 1 to N, N is an integer not less than 1, x represents a start offset of the log data chunk relative to the file page, and y represents a length of the log chunk. For example, when the log data chunk is $\log_1(10, 30)$, it indicates that a start offset of the log data chunk is the $10^{th}$ byte of a first object cache page, and a length of the log data chunk is 30 bytes. In this step, after the CPU 105 obtains the access location of the write request 200, the CPU 105 may calculate, according to the access location, the size of the to-be-written data, and the size of the cache page, a logical page number of an object cache page to be accessed by the write request 200, so as to determine, according to the calculated logical page number, the object cache page to be accessed by the write request 200. As described above, the cache page is a memory page that is in the memory and that is used to cache file data. Therefore, in this embodiment of the present disclosure, the object cache page is a memory page that is in the memory and that is used to cache file data, to be modified by the to-be-written data, in the object file.

For example, the access location is the $89^{th}$ byte of the first file, and the size of the to-be-written data is 212 bytes, that is, the write request 200 needs to write 212 bytes to the first file starting from the $89^{th}$ byte of the first file. For convenience of description, a cache page having a size of 100 bytes is used as an example for description. According to this manner, the $0^{th}$ to $99^{th}$ bytes of the first file constitute a first page $p^1$ of the first file, the $100^{th}$ to $199^{th}$ bytes of the first file constitute a second page $p^2$ of the first file, the $200^{th}$ to $299^{th}$ bytes of the first file constitute a third page $p^3$ of the first file, the $300^{th}$ to $399^{th}$ bytes of the first file constitute a fourth page $p^4$ of the first file, and so on. Therefore, the CPU 105 may determine, according to the access location, the size of the to-be-written data, and the size of the cache page, the first page to the fourth page of the first file to be accessed by the write request, that is, the first page to the fourth page of the first file are determined as the object cache pages, and the value of i ranges from 1 to 4.

Further, the CPU 105 may determine four data chunks: $\log_1(89, 11)$, $\log_2(0, 100)$, $\log_3(0, 100)$, and $\log_4(0, 1)$ that are respectively written to the first page to the fourth page of the first file. Specifically, the CPU 105 may determine the log data chunk $\log_1(89, 11)$ to be written to the first page, the log data chunk $\log_2(0, 100)$ to be written to the second page, the log data chunk $\log_3(0, 100)$ to be written to the third page, and the log data chunk $\log_4(0, 1)$ to be written to the fourth page. $\log_1(89, 11)$ is used to represent 11 bytes starting from a location of the $89^{th}$ byte of the first page, $\log_2(0, 100)$ is used to represent 100 bytes starting from a location of the $0^{th}$ byte of the second page, $\log_3(0, 100)$ is used to represent 100 bytes starting from a location of the $0^{th}$ byte of the third page, and $\log_4(0, 1)$ is used to represent one byte starting from a location of the $0^{th}$ byte of the fourth page. In this embodiment of the present disclosure, a log data chunk is a set of data to be written to each object cache page. In other words, the log data chunk is modified data of each object cache page.

Figure 4:
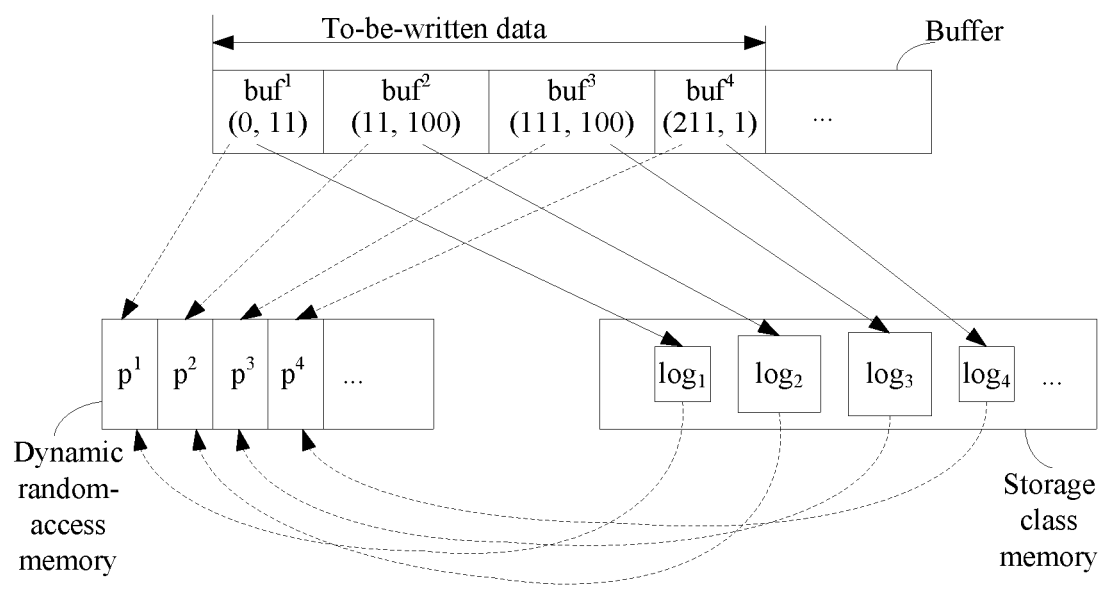
FIG. 4 is a schematic diagram of data processing according to an embodiment of the present disclosure.

In step 315, the CPU 105 determines location information of the log data chunk $\log_i(x, y)$ corresponding to each object cache page $OCP_i$. After the CPU 105 obtains the log data chunk $\log_i(x, y)$ corresponding to each object cache page $OCP_i$, the CPU 105 may further divide, according to a size of the data chunk to be written to each object cache page, the to-be-written data cached in the buffer into four parts, so as to obtain the location information of the log data chunk corresponding to each object cache page. The location information of the log data chunk refers to a location, in the buffer to which the buffer pointer carried in the write request 200 points, of data to be written to each object cache page. For example, as shown in FIG. 4, the CPU 105 can divide, according to information about the data chunks to be written to the four pages, the to-be-written data cached in the buffer into four parts: $buf^1(0, 11)$, $buf^2(11, 100)$, $buf^3(111, 100)$, and $buf^4(211, 1)$, so as to obtain location information of log data chunks. $buf^1(0, 11)$ is used to indicate that data of $\log_1(89, 11)$ is 11 bytes starting from the $0^{th}$ byte in the buffer, $buf^2(11, 100)$ is used to indicate that data of $\log_2(0,$ 100) is 100 bytes starting from the $11^{th}$ byte in the buffer, $buf^3(111, 100)$ is used to indicate that data of $log_3(0, 100)$ is 100 bytes starting from the $111^{th}$ byte in the buffer, and $buf^4(211, 1)$ is used to indicate that data of $log_4(0, 1)$ is one byte starting from the $211^{th}$ byte in the buffer.

It can be understood that, during actual application, the object cache page to be accessed by the write request 200 may be one or more cache pages, that is, a value of N may be an integer not less than 1. In other words, to-be-written data carried in one access request may be data to be written to one page, or may be data that needs to be written to multiple pages. The foregoing describes an example in which data is written to multiple object cache pages. In another case, for example, the access location is the $89^{th}$ byte of the first file, and a size of one page is 100 bytes. If the size of the to-be-written data is five bytes, the CPU 105 needs to write five bytes to the first file starting from the $89^{th}$ byte of the first file according to the write request 200. In this case, the CPU 105 modifies only the first page of the first file, that is, N=1. Therefore, the CPU 105 may determine, according to the access location, the size of the to-be-written data, and the size of the cache page, that a log data chunk to be written to the first page is $log_1(89, 5)$. Further, the CPU 105 may obtain location information buf(0, 5) of the log data chunk to be written to the object cache page. The location information is a location in the buffer to which the buffer pointer carried in the write request 200 points.

In step 320, the CPU 105 determines whether the PCM 125 stores a log chain of the object cache page $OCP_i$. The log chain of the object cache page $OCP_i$ is used to record information that is about modified data of the object cache page $OCP_i$ in at least one modification process. When the PCM 125 stores no log chain structure of the object cache page $OCP_i$, the method goes to step 325, or when the PCM 125 stores the log chain structure of the object cache page $OCP_i$, the method goes to step 330. A person skilled in the art may know that, after the CPU 105 receives the write request 200, the CPU 105 may further obtain metadata information of the object file according to the file identifier carried in the write request 200. In this embodiment of the present disclosure, the metadata information of the object file includes information about a cache page structure of the object file. After the CPU 105 determines, in step 310, the N object cache pages to be accessed by the write request 200, the CPU 105 may obtain cache page structures of the N object cache pages from the metadata information of the object file, so as to determine, according to the information recorded in the cache page structure, whether the PCM 125 stores the log chain of the object cache page $OCP_i$.

Figure 5:
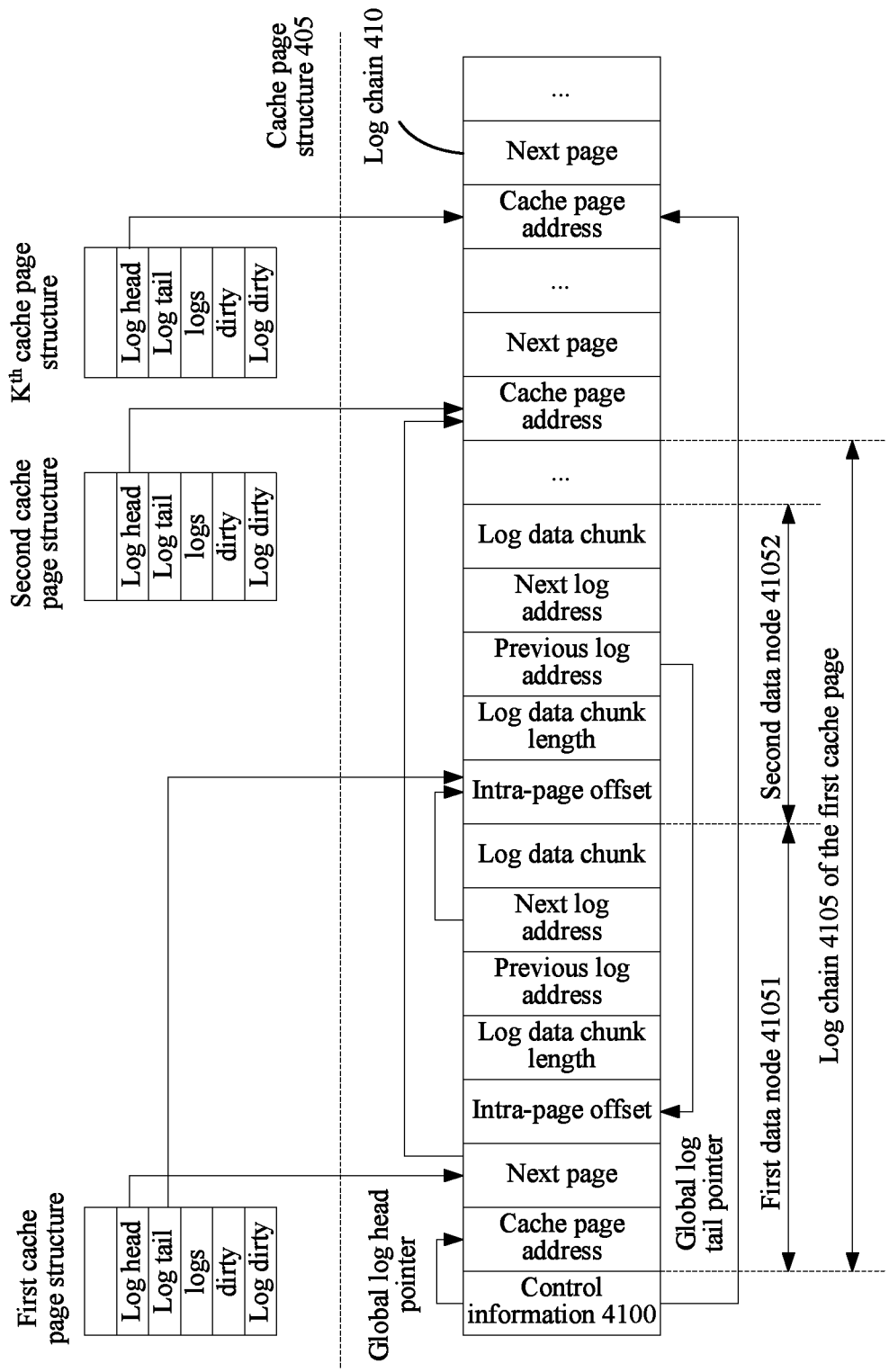
FIG. 5 is a schematic diagram of a cache page structure and a log chain structure according to an embodiment of the present disclosure.

FIG. 5 is a schematic diagram of a cache page structure and a log chain structure according to an embodiment of the present disclosure. In this embodiment of the present disclosure, as shown in FIG. 2, a cache page may be cached in the DRAM 120, and a log chain of the cache page may be stored in the PCM 125. As shown in FIG. 5, a cache page structure 405 shows cache page structures of multiple cache pages, for example, a first cache page structure, a second cache page structure, and an $K^{th}$ cache page structure. K is an integer greater than 2. A person skilled in the art may know that, the cache page structure is used to describe metadata information of a cache page. For example, the cache page structure may be used to describe information such as an offset location and a size of the cache page, and whether the cache page is locked. In this embodiment of the present disclosure, each cache page has a corresponding cache page structure, and each cache page structure further includes information about a log chain of the cache page. Specifically, the following fields are maintained in each cache page structure.

A log head field is used to point to the first address of the log chain (log chain) of the cache page. The log chain is stored in the PCM 125. The first address of the log chain of the cache page may include an inode of a file to which the cache page belongs and a logical page number of the cache page. The inode of the file is used to determine the file to which the cache page belongs, and the logical page number is used to determine the cache page.

A log tail field is used to point to the first address of the last data node in the log chain of the cache page. In this embodiment of the present disclosure, a log chain of each cache page includes a data node dynamically generated in at least one modification process of the cache page. One data node is used to record information about one log data chunk of the cache page in one modification process. The log data chunk is modified data of the cache page in the one modification process. Each data node includes a data field storing a log data chunk, a pointer field storing an address of another data node, and another information field, and the another information field may be used to store other information such as the address of the data node.

A logs field is used to indicate a quantity of data nodes in the log chain of the cache page.

A dirty field is used to indicate whether the cache page has dirty data. In other words, "dirty" is used to indicate whether the cache page is synchronized with file data in a magnetic disk. For example, when a "dirty" indication bit is 1, it indicates that the cache page has dirty data, and data in the cache page is inconsistent with the file data in the magnetic disk. When the "dirty" indication bit is 0, it indicates that the data in cache page is consistent with the file data in the magnetic disk.

A log dirty field is used to indicate whether the cache page is synchronized with a log data chunk indicated by a data node in the log chain of the cache page. For example, when the "log dirty" field is 1, it indicates that the log data chunk indicated by the data node in the log chain of the cache page has new data, and data in the data node is inconsistent with data in the cache page. When the "log dirty" field is 0, it indicates that the log data chunk indicated by the data node in the log chain of the cache page is consistent with the data in the cache page. In other words, when the "log dirty" field is 1, it indicates that the log data chunk indicated by the data node in the log chain of the cache page has not been updated to the cache page. When the "log dirty" field is 0, it indicates that the log data chunk indicated by the data node in the log chain of the cache page has been updated to the cache page.

In this embodiment of the present disclosure, after the CPU 105 determines the object cache page, for example, one object cache page, the CPU 105 may obtain a cache page structure of the object cache page from the metadata information of the object file, so as to determine, according to a "log head" indication bit or a "log tail" indication bit in the cache page structure of the object cache page, whether the PCM 125 stores a log chain of the object cache page. Specifically, when the CPU 105 determines that "log head" or "log tail" is null in the cache page structure of the object cache page OCP, the CPU 105 may determine that the object cache page $OCP_i$ has not been modified, and the object cache page has no log chain. When the CPU 105 determines that "log head" or "log tail" includes an address in the cache page structure of the object cache page $OCP_i$, it indicates that the object cache page has been modified, and the CPU 105 can find a log chain of the object cache page $OCP_i$ according to an address pointer recorded in the log head field. For example, the first cache page shown in FIG. 5 is the object cache page. When a log head field in the first cache page structure is null, it indicates that the first cache page has no log chain. When the log head field in the first cache page structure includes an address, it indicates that the PCM 125 stores a log chain of the first cache page. It can be understood that, during actual application, whether the object cache page has a log chain may alternatively be determined using a field such as "logs" or "log dirty" in the cache page structure of the object cache page. For example, when the logs field is 0, it indicates that the object cache page has no log chain. When "logs" is not 0, it indicates that the object cache page has a log chain. A specific manner of determining whether the PCM 125 stores a log chain of the object cache page is not limited in this embodiment of the present disclosure.

In step 325, the CPU 105 creates a log chain for the object cache page $OCP_i$ in the PCM 125. When the CPU 105 determines, in step 320 according to information in the cache page structure of the object cache page, that the PCM 125 stores no log chain of the object cache page $OCP_i$, the CPU 105 may create the log chain for the object cache page in the PCM 125. When the log chain is created for the object cache page, physical space may be allocated in the PCM 125 according to the size of the to-be-written data, and a data structure of the log chain is initialized in the allocated physical space.

In this embodiment of the present disclosure, the PCM 125 stores a log chain of each updated cache page. In other words, each updated cache page has a log chain. The log chain is used to record information about modified information of the cache page in at least one modification process. As shown in FIG. 5, during actual application, a global log chain structure may be created for the file system and specifically shown as 410 in FIG. 5. The global log chain structure 410 includes log chains of multiple cache pages. A log chain of each cache page may be considered as a node or a sub log chain in the global log chain. The log chain structure 410 may include control information 4100 and log chains of the cache pages. The control information 4100 includes a global log head pointer and a global log tail pointer. The global log head pointer is used to point to a head of a log chain of the first cache page in the global log chain structure 410. Specifically, the global log head pointer is used to point to the first address of the global log chain structure in the PCM 125. The global log tail pointer is used to point to the first address of a log chain of the last cache page in the global log chain structure 410. In this embodiment of the present disclosure, the first address of a log chain of a cache page is a cache page address shown in FIG. 5, and the cache page address may include an inode of a file to which the cache page belongs and a logical page number of the cache page.

As shown in FIG. 5, a log chain of each cache page includes a data node formed in at least one modification process of the cache page. The data node includes information such as information about a log data chunk and a pointer that points to another data node. The information about the log data chunk may include the log data chunk or a storage address of the log data chunk in the PCM 125. During actual application, after the CPU 105 creates a log chain for a cache page, the global log tail pointer in the control information of the global log chain needs to point to the first address of the newly created log chain structure of the cache page. According to this manner, the newly created log chain of the cache page can be added to the global log chain of the file system according to a chronological order of creation. In this way, after a fault occurs in the computer system, in a recovery process, data written to the computer system can be restored according to the log chains of the cache pages in the global log chain, thereby retaining data consistency and facilitating system management.

For convenience of description, a log chain 4105 of the first cache page in FIG. 5 is used as an example to specifically describe a log chain structure of each cache page. As shown in FIG. 5, the log chain 4105 of the first cache page includes a first data node 41051 and a second data node 41052. The first data node 41051 and the second data node 41052 may both include information about a log data chunk, a pointer that points to another data node, logical location information of the log data chunk, and the like. It can be understood that, one log data chunk can be obtained by modifying the first cache page once. In this embodiment of the present disclosure, a log data chunk in a modification process of the first cache page may be recorded in the log chain 4105 of the first cache page. For example, a first log data chunk obtained in the first modification process of the first cache page may be stored in the first data node 41051, and a second log data chunk obtained in the second modification process of the first cache page may be stored in the second data node 41052.

In this embodiment of the present disclosure, a "log data chunk" field in the log chain is used to record information about modified data of the cache page in a current modification process. For example, as shown in FIG. 5, a "log data chunk" in the first data node 41051 is used to indicate modified data of the first cache page in the first modification process, and a "log data chunk" in the second data node 41052 is used to indicate modified data of the first cache page in the second modification process. During actual application, in one case, the modified data may be directly recorded in the "log data chunk" part. Alternatively, in another case, the modified data may be stored in other storage space in the PCM 125, and then an address of the modified data is recorded in the "log data chunk" part. A data storage manner in the log chain structure is not limited in this embodiment of the present disclosure, provided that modified data of the cache page in multiple modification processes can be found according to the log chain.

In a process of recording the log data chunks in the log chain, the log data chunks may be sequentially recorded according to a modification order of the object cache page. In this embodiment of the present disclosure, to record the modification order of the object cache page, each data node in the log chain includes information about a pointer that points to another data node. The pointer that points to the another data node may include the following fields such as a previous log address field and a next log address field. The "previous log address" is used to indicate an address of a previous data node. Specifically, the "previous log address" is used to indicate a start address of the previous data node in the SCM. For example, as shown in FIG. 5, because an "intra-page offset" field is the first field in a data node, the "previous log address" may point to an "intra-page offset" field in a log data chunk of the previous data node. The previous data node is a data node inserted right before a current data node, and is used to indicate information about modified data of the object cache page in a previous modification process. The "next log address" is used to indicate an address of a next data node. Specifically, the "next log address" is used to indicate a start address of the next data node in the SCM. For example, as shown in FIG. 5, the "next log address" may point to an "intra-page offset" field in a log data chunk of the next data node. The next data node is a data node inserted right after a current data node, and is used to indicate information about modified data of the object cache page in a next modification process. It can be understood that, a "previous log address" field in the first data node in a log chain structure of a cache page is null. For example, the first data node 41051 in FIG. 5 is the first data node in the log chain 4105 of the first cache page. Therefore, a "previous log address" field in the first data node 41051 is null. Similarly, a "next log address" field in the last data node in the log chain structure of the cache page is null. When a "next log address" field in a data node is null, it indicates that the data node is a data node generated in the last modification process of a cache page corresponding to the data node.

In this embodiment of the present disclosure, to record specific information of a log data chunk in the object cache page, each data node further includes information about an intra-page location of the log data chunk. The information about the intra-page location of the log data chunk may include information such as an intra-page offset and a log data length. The intra-page location of the log data chunk is a location of the log data chunk in the object cache page. Specifically, the "intra-page offset" is used to indicate a start location of the log data chunk in the cache page. The "log data length" is used to indicate length information of the log data chunk.

In this embodiment of the present disclosure, to establish an association between a log chain of a cache page and the cache page, in a log chain of each cache page, the first data node of the cache page further includes information about a "cache page address". The information about the "cache page address" may include a file Mode and a logical page number. The file inode is used to indicate a file to which the log chain belongs, and the logical page number is used to indicate a cache page to which the log chain belongs. As shown in FIG. 5, a "cache page address" field in the first data node 41051 of the first cache page includes an inode of a file to which the first cache page belongs and a logical page number of the first cache page. Further, to establish an association between log chains of multiple cache pages, the first data node of each cache page further includes information about a pointer that indicates a next page, and the "next page" is used to indicate the first data node in a log chain of a cache page of a next to-be-modified file in the file system. The log chain of the cache page of the next to-be-modified file in the file system can be found according to the "next page" pointer.

In step 330, the CPU 105 inserts a data node into the log chain of the object cache page $OCP_i$. The inserted data node includes information about the log data chunk $log_i(x, y)$. In this embodiment of the present disclosure, in one case, after the CPU 105 creates the log chain for the object cache page $OCP_i$ in the PCM 125, the method may go to step 330, so that the CPU 105 inserts the data node into the created log chain and records the information about the log data chunk in the current modification process. In another case, when the CPU 105 determines, in step 320, that the PCM 125 stores the log chain of the object cache page $OCP_i$, the method may go to step 330, so that the CPU 105 may insert the data node into the existing log chain of the object cache page $OCP_i$, and record the information about the log data chunk in the current modification process. The information about the log data chunk may specifically include the log data chunk or a storage address of the log data chunk in the PCM 125. The information about the log data chunk may further include information such as a pointer that points to another data node and a location of the log data chunk. For example, after the CPU 105 creates the log chain structure for the first cache page, the CPU 105 may record information about the first log data chunk in the log chain structure of the first cache page. Specifically, data in the first log data chunk may be directly recorded in the "log data chunk" field in the first data node 41051, or a storage address of the first log data chunk in the PCM 125 may be recorded in the "log data chunk" field in the first data node 41051. This is not limited herein. In addition, information such as a location and a length of the first log data chunk and a pointer that points to another data node may be recorded in the first data node 41051.

For clarity of description, for example, the log data chunk to be written to the first page is $log_1(89, 11)$, and the first page is the first cache page shown in FIG. 5. After the CPU 105 creates the log chain 4105 for the first cache page, the CPU 105 may record an inode of the first file and a logical page number of the first cache page in the "cache page address" field of the first data node 41051, record 89 in an "intra-page offset" field of the first data node 41051, record 11 in a "log data length" field, and record data of $buf^1(0, 11)$ in the "log data chunk" field or record, in the "log data chunk" field, a storage address of the data chunk $log_1(89, 11)$ in the PCM 125.

A person skilled in the art may know that, because nodes in a linked list structure may be dynamically generated and inserted in a running process of the system, data nodes in the log chain 4105 of the first cache page may also be dynamically generated and inserted. When a new data node is generated, a pointer that points to another data node and that is in an existing data node in the linked list needs to be correspondingly updated, and a log tail pointer in the cache page structure also needs to be updated. For example, the first data node 41051 is the first data node of the first cache page. Therefore, when the first data node 41051 is created, a "previous log address" and a "next log address" in the first data node 41051 are null. In the running process of the system, after the second data node 41052 is dynamically generated, the "next log address" pointer in the first data node 41051 may be updated according to the second data node 41052, so that the "next log address" pointer in the first data node 41051 points to a start address of the second data node 41052 in the PCM 125. In addition, the log tail pointer in the first cache page structure needs to be updated to point to the start address of the second data node 41052 in the PCM 125. Specifically, because the "intra-page offset" field is the first field of the second data node 41052, the "next log address" pointer in the first data node 41051 may point to the "intra-page offset" field in the second data node 41052, and the log tail pointer in the first cache page structure is updated to point to the "intra-page offset" field in the second data node 41052. The "intra-page offset" is used to indicate a location of a log data chunk of the second data node 41052 in the first cache page.

In this embodiment of the present disclosure, when the CPU 105 determines, in step 320, that the PCM 125 stores the log chain of the object cache page $OCP_i$, in this step, the CPU 105 may insert the data node at a tail of the existing log chain of the object cache page $OCP_i$, and record the information about the log data chunk in the current modification process. For example, in step 320, when the log tail field in the first cache page structure is not null, the CPU 105 may determine that the PCM 125 stores the log chain structure of the first cache page. In other words, when the log tail field in the first cache page structure is not null, it indicates that the first cache page has been modified before the current modification. In this case, in this step, the CPU 105 may find the last data node in the log chain 4105 of the first cache page according to the log tail field in the first cache page structure. In this embodiment of the present disclosure, the last data node of the first cache page stores information about modified data right before the current time, or in other words, the last data node of the first cache page stores the last modification version of the first cache page. After the CPU 105 finds the last data node of the first cache page, the CPU 105 may add a new data node after the last data node, and store information about the data chunk $\log_i(x, y)$ in the added new data node. For example, the last data node in the log chain of the first cache page is the first data node 41051, newly modified data is the data chunk $\log_i(x, y)$, and the new data node is the second data node 41052. The CPU 105 may store the information about the data chunk $\log_i(x, y)$ in the second data node 41052. The information about the data chunk $\log_i(x, y)$ may include the data chunk $\log_i(x, y)$, a log data length, an intra-page offset, and information about a pointer that points to another data node. In addition, the "next log address" pointer in the first data node 41050 to which the log tail pointer of the cache page points may point to the start address of the second data node 41052 in the PCM 125.

It can be understood that, in this manner provided in this embodiment of the present disclosure, the modified data of the object cache page is recorded in the log chain according to the modification order, so that different update versions of the object cache page are identified according to an update order of data nodes in the log chain. During actual application, when the data nodes are sequentially inserted, the data nodes may be inserted at the tail of the log chain in a head-to-tail order, or may be inserted at the head of the log chain in a tail-to-head order. A specific insertion order in this embodiment of the present disclosure is not limited, provided that an update order of the object cache page can be identified according to the data nodes in the log chain.

In this embodiment of the present disclosure, after the CPU 105 writes the to-be-written data 205 to the PCM 125 according to the write request 200 (as shown in FIG. 2), the CPU 105 may respond to an application with a write success message. The write success message is used to indicate that the to-be-written data is successfully written to the storage device, thereby reducing an access request processing delay.

In this embodiment of the present disclosure, when the CPU 105 needs to modify data in a file according to an access request, the CPU 105 does not directly write modified data to an object cache page of the file, but writes the modified data to space of the PCM 125, and records, using a log chain, information that is about modified data of the object cache page in each modification process. Because the PCM 125 is non-volatile, and written data is stored in the PCM 125 using the log chain, modified data of the object cache page in multiple modification processes can be recorded in a chronological order, thereby facilitating identification of a version relationship between log data chunks, and ensuring consistency between stored data and the written data. In a data reading process, valid data can be determined according to time at which log data chunks of a same cache page are written, thereby ensuring correctness of read data. When the access request processing method provided in FIG. 3 is compared with the prior art in which different states of a memory block are maintained to retain data consistency, because state maintenance brings higher system overheads than a write update process, the computer system 100 provided in the present disclosure has lower system overheads in the access request processing process. In addition, in this embodiment of the present disclosure, the size of the log data chunk can be less than that of a page, and therefore, file modification at a granularity smaller than a page can be supported, implementing a more flexible modification manner.

Figure 6:
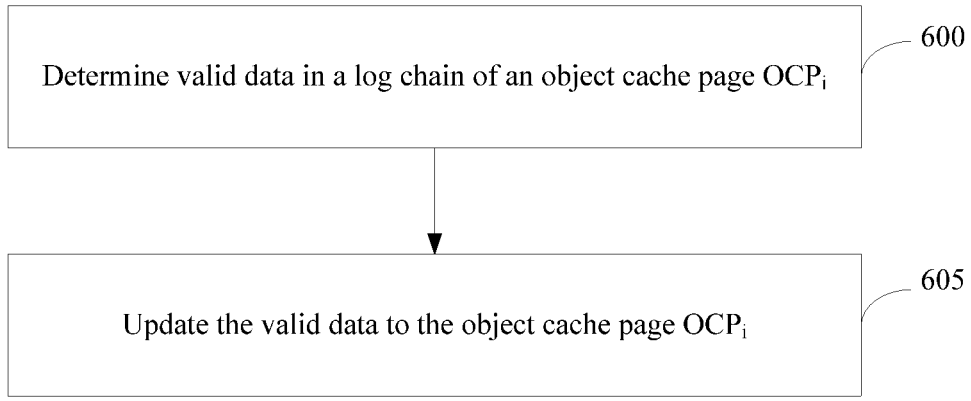
FIG. 6 is a flowchart of a data merging method according to an embodiment of the present disclosure.

As shown in FIG. 2, in the computer system 100 provided in this embodiment of the present disclosure, after the to-be-written data 205 is written to the PCM 125 using the method shown in FIG. 3, in some cases, a merging operation may be triggered, to update the log data chunk in the PCM 125 to the cache page of the DRAM 120. For example, in one case, to save storage space of the system, storage space of the PCM 125 needs to be reclaimed in time, and the log chain of the cache page needs to be reclaimed. In this case, first, the log data chunk in the PCM 125 needs to be updated to the DRAM 120, and then the updated cache page in the DRAM 120 is written to the magnetic disk 130, to update file data in the magnetic disk. In another case, when a fault occurs in the computer system when written data is processed, after the computer system is restarted, the computer system may write data back according to the log chain in the PCM 125 for restoration, to ensure that the written data is not lost and retain data consistency. In this case, first, the log data chunk in the PCM 125 needs to be updated to the cache page of the DRAM 120, and then the updated cache page is written to the magnetic disk 130. In still another case, when data is read, the log data chunk also needs to be updated to the object cache page according to the log chain in the PCM 125, so that correct data can be read. A specific case in which the merging operation is triggered is not limited in this embodiment of the present disclosure. The following describes, with reference to FIG. 6, the process shown in FIG. 2 of updating the log data chunk to the cache page of the DRAM 120. FIG. 6 shows a data merging method according to an embodiment of the present disclosure. It can be understood that, a merging operation may be performed, according to the method shown in FIG. 6, for each cache page having a log chain. For convenience of description, the log chain of any object cache page $OCP_i$ in FIG. 3 is still used as an example for description.

In step 600, the CPU 105 determines valid data in the log chain of the object cache page $OCP_i$. In this embodiment of the present disclosure, the valid data is latest modified data of the object cache page. Specifically, the CPU 105 may determine the valid data in the log chain of the object cache page according to information that is about a log data chunk and that is recorded in at least one data node of the object cache page $OCP_i$. The CPU 105 may determine the valid data in the log chain according to an update order of data nodes in the log chain of the object cache page $OCP_i$ and information about an intra-page location of the log data chunk. All the data nodes in the log chain are sequentially obtained according to a chronological order of modifying the cache page. According to this manner, a data node at a log chain tail is obtained later than a data node at a log chain head. The information about the intra-page location of the log data chunk may be obtained according to two pieces of information: an "intra-page offset" and a "data length" in a data node.

In a specific data chunk merging process, the following two cases may occur. In a first case, none of intra-page locations of log data chunks in the data nodes in the log chain overlap. In this case, the CPU 105 may determine that all the log data chunks in the data nodes in the log chain are valid data. The log chain of the first cache page shown in FIG. 5 is used as an example. As shown in FIG. 5, the log chain of the first cache page has two data nodes: the first data node 41051 and the second data node 41052, and the second data node is generated later than the first data node. If an address of a log data chunk in the first data node 41051 is the $30^{th}$ to $50^{th}$ bytes, and an address of a log data chunk in the second data node 41052 is the $60^{th}$ to $80^{th}$ bytes, the CPU 105 determines that the log data chunk in the first data node and the log data chunk in the second data node are both valid data.

In a second case, intra-page locations of log data chunks in the data nodes in the log chain overlap. In this case, for at least two log data chunks that overlap, the CPU 105 determines that data of an overlapping part included in a data node generated later in the log chain is valid data, and the CPU 105 separately determines that data of all non-overlapping parts in the at least two log data chunks is valid data. In other words, when an overlap exists, the CPU 105 determines all data in a data node generated later and data of a non-overlapping part in a data node generated earlier are valid data. For example, for the log chain of the first cache page in FIG. 5, if an address of a log data chunk in the first data node 41051 is the $30^{th}$ to $70^{th}$ bytes, and an address of a log data chunk in the second data node 41052 is the $50^{th}$ to $90^{th}$ bytes, the CPU 105 determines that the $30^{th}$ to $49^{th}$ bytes in the first log data chunk and the $50^{th}$ to $90^{th}$ bytes in the second log data chunk are valid data.

In step 605, the valid data is updated to the object cache page $OCP_i$, to obtain an updated object cache page $OCP_i'$. Specifically, the CPU 105 may use the determined valid data in the log chain to replace data that is in the object cache page $OCP_i$ and that has a same location as the valid data. For example, if the CPU 105 determines, in step 600, that an address of the valid data in the log chain of the first cache page is the $30^{th}$ to $90^{th}$ bytes, the CPU 105 may replace data of the $30^{th}$ to $90^{th}$ bytes in the first cache page with the determined valid data of the $30^{th}$ to $90^{th}$ bytes in the log chain, to obtain an updated first cache page.

During actual application, to reclaim the storage space of the PCM 125 in time, and reclaim the log chain of the cache page, when a specified condition is satisfied, the CPU 105 may update the log data chunk stored in the PCM 125 to the corresponding cache page according to the merging method shown in FIG. 6, and further update the file data in the magnetic disk according to a cache page obtained after merging. For example, when the storage space in the PCM 125 is lower than a preset threshold or a specified time is reached, the CPU 105 may update the log data chunk stored in the PCM 125 to the corresponding cache page according to the merging method shown in FIG. 6, and further update the file data in the magnetic disk according to a cache page obtained after merging. After writing data of the updated cache page to the magnetic disk 130, the CPU 105 may delete the log chain of the cache page, to release the storage space of the PCM 125 and save system resources.

During actual application, when storage space occupied by a log chain needs to be reclaimed, the CPU 105 may specifically determine, using the "dirty" field in the cache page structure of each cache page, whether data of the cache page needs to be flushed to the magnetic disk 130. One cache page is used as an example. When a "dirty" field is 1, the CPU 105 determines that data of the cache page needs to be flushed to the magnetic disk 130; or when the "dirty" field is 0, the CPU 105 determines that the data of the cache page does not need to be flushed to the magnetic disk 130. When the CPU 105 determines that the data of the cache page needs to be flushed to the magnetic disk 130, the CPU 105 further needs to determine, according to the "log dirty" field in the cache page structure of the cache page, whether a log data chunk in the PCM 125 needs to be updated to the cache page. For example, when the "log dirty" field is 1, it indicates that the PCM 125 includes newly modified data of the cache page, and the CPU 105 needs to first update the log data chunk in the PCM 125 to the cache page in the DRAM 120, and then flush data in the updated cache page to the magnetic disk 130. When the "log dirty" field is 0, it indicates that the log data chunk in the log chain of the cache page has been updated to the cache page, and that the PCM 125 does not include newly modified data of the cache page, and the CPU 105 may directly flush data in the updated cache page to the magnetic disk 130.

It can be understood that, in this embodiment of the present disclosure, the write success message can be returned to the application after the to-be-written data 205 is written to the PCM 125. The log data chunk in the log chain is not modified data at a granularity of a page. Therefore, when being used, the access request processing method of the present disclosure can support file modification at a small granularity. In addition, in this embodiment of the present disclosure, after the data is written to the PCM 125, the modified data in the PCM 125 is not immediately written to the magnetic disk 130, but instead, the log data chunk stored in the PCM 125 is updated to the corresponding cache page only when a specific condition is satisfied, and the file data in the magnetic disk is updated according to a cache page obtained after merging. Compared with an existing write-ahead logging (WAL) manner and copy on write manner for retaining data consistency, in this manner, the data is first merged, and then data obtained after merging is written to the magnetic disk, so that write amplification of the system can be reduced.

As described above, in this embodiment of the present disclosure, after the computer system is restarted due to a fault, data may be written back according to the log chain in the PCM 125 for restoration, to ensure that written data is not lost and to retain data consistency. Specifically, after the computer system is restarted due to the fault, the CPU 105 may sequentially restore, according to the global log head pointer in the control information of the global log chain in the PCM 125, data of all cache pages having log chains. Specifically, for any cache page having a log chain, the CPU 105 can traverse each log data chunk in the log chain of the cache page, determine valid data in the log chain according to the method shown in FIG. 6, update the determined valid data to the cache page, and then write data of the updated cache page to the magnetic disk 130. This manner can ensure that the written data is not lost.

Figure 7:
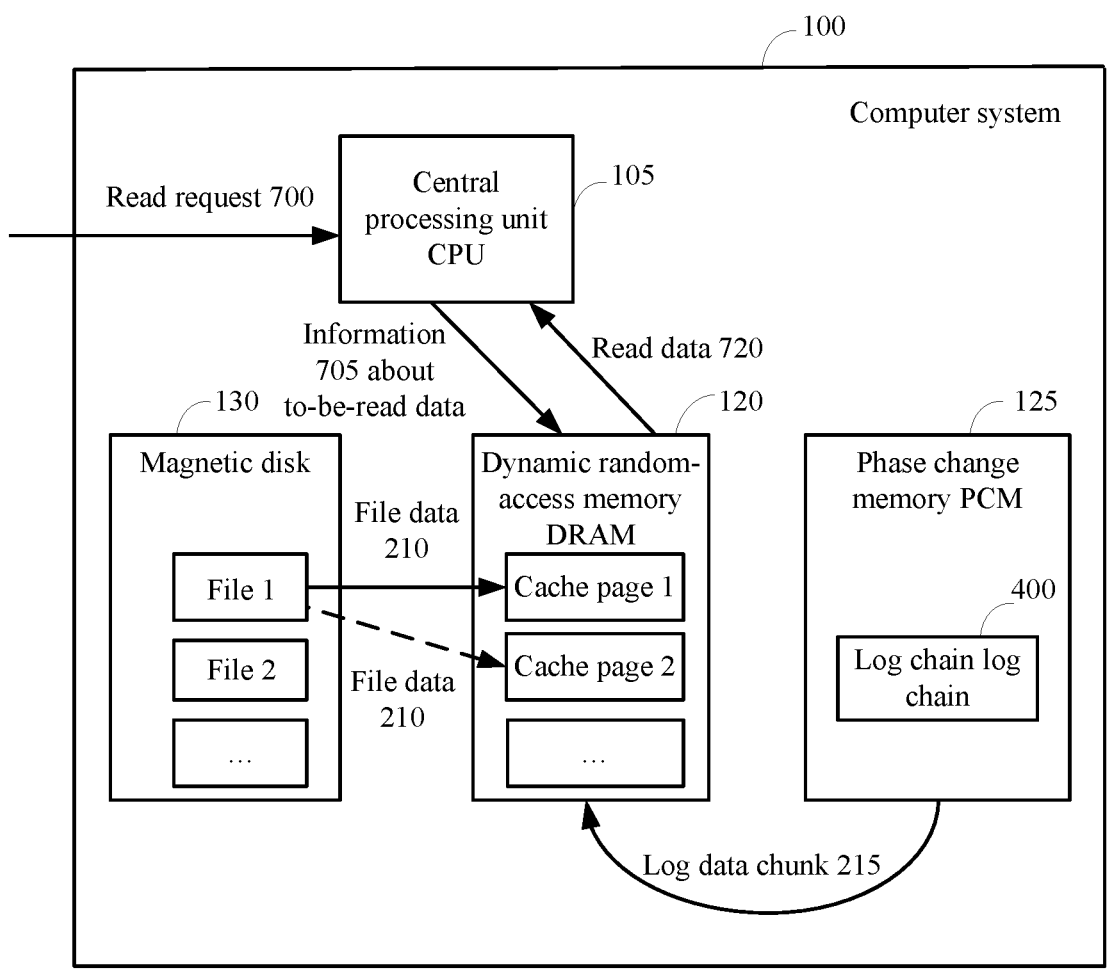
FIG. 7 is a schematic signaling diagram of another computer system according to an embodiment of the present disclosure.
Figure 8:
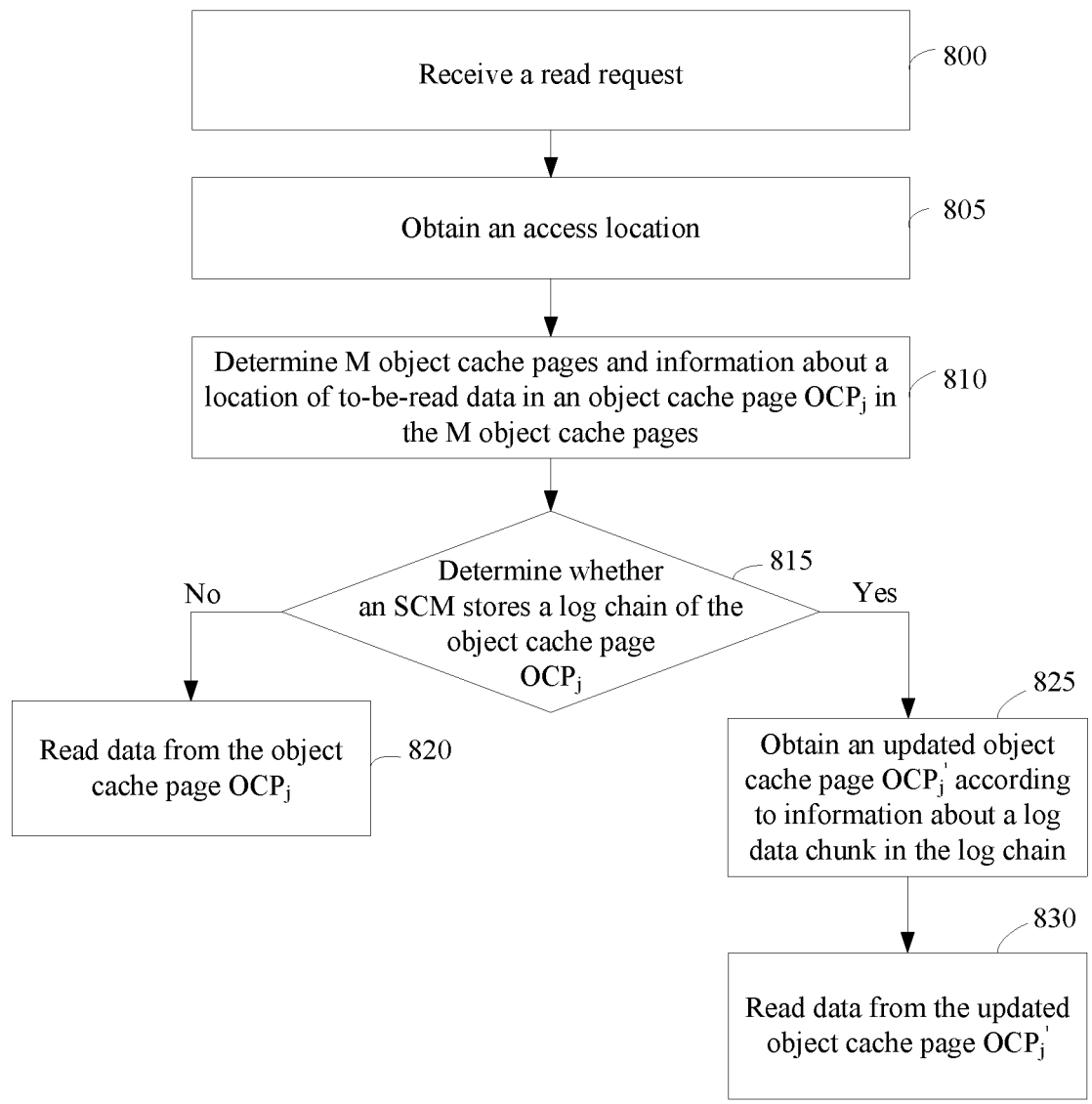
FIG. 8 is a flowchart of another access request processing method according to an embodiment of the present disclosure.

FIG. 2 and FIG. 3 describe, from the perspective of a data writing process, the access request processing method provided in the embodiments of the present disclosure. The following further describes, from the perspective of a data reading process, the access request processing method provided in the embodiments of the present disclosure. FIG. 7 is another schematic signaling diagram of a computer system 100 according to an embodiment of the present disclosure. FIG. 7 shows a signaling interaction process of components in the computer system 100 shown in FIG. 1 in the data reading process. FIG. 8 is a flowchart of another access request processing method according to an embodiment of the present disclosure. FIG. 8 shows an example of reading data. The method shown in FIG. 8 may be implemented by the CPU 105 in the computer system 100 shown in FIG. 7 by invoking the data processing logic 1051. The following describes, in detail with reference to FIG. 7 and FIG. 8, how to read data from the computer system 100 provided in this embodiment of the present disclosure. As shown in FIG. 8, the method may include the following steps.

In step 800, the CPU 105 receives a read request 700. As shown in FIG. 7, when the CPU 105 receives the read request 700, the CPU 105 may invoke the data processing logic 1051 to process the read request 700. The read request carries a file identifier and a size of to-be-read data. For a specific description of the file identifier, refer to the foregoing description. In the embodiment shown in FIG. 8, the file identifier carried in the read request 700 may be a file handle of an object file to be accessed, or may be another file descriptor other than the file handle. This is not limited herein, provided that a process can identify the object file and find description information of the object file using the file identifier. For example, the file identifier carried in the read request 700 may be a file identifier of a second file in the magnetic disk 130. It should be noted that, the first file and the second file in this embodiment of the present disclosure are only for differentiating accessed files in different access procedures, instead of limiting specific files. According to this manner, the first file and the second file may be same files or may be different files.

In step 805, the CPU 105 obtains an access location according to the file identifier. The access location is used to indicate a start address data to be read by the read request in the object file. The access location may be a logical access location. In this step, a description about how the CPU 105 obtains the access location according to the file identifier carried in the read request 700 is similar to that of step 305, and for details, refer to the description of step 305.

In step 810, the CPU 105 determines, according to the access location, the size of the to-be-read data, and a size of a cache page, M object cache pages and location information of the to-be-read data in an object cache page $OCP_j$ in the M object cache pages. A value of j ranges from 1 to M, and M is an integer not less than 1. As described above, a size of a page is generally 4K bytes. A manner in which the CPU 105 determines the M object cache pages in this step is similar to the manner in which the CPU 105 determines the N object cache pages in step 310, and for details, refer to the description of step 310.

Further, in this step, the CPU 105 may specifically determine, according to the access location, the size of the to-be-read data, and the size of the cache page, the location information of the to-be-read data in the object cache page $OCP_j$ in the M object cache pages. For convenience of description, for example, the object cache page $OCP_j$ is a file page of the second file cached in the DRAM, and a size of a cache page is 100 bytes. If the access location determined in step 805 is the $150^{th}$ bytes of the second file, and the size of the to-be-read data is 210 bytes, the CPU 105 may determine that the object cache pages are a second cache page $p^2$ (including the $100^{th}$ to $199^{th}$ bytes of the second file), a third cache page $p^3$ (including the $200^{th}$ to $299^{th}$ bytes of the second file), and a fourth cache page $p^4$ (including the $300^{th}$ to $399^{th}$ bytes of the second file) of the second file. In addition, the CPU 105 can determine that the location information of the data to be read by the read request 700 is respectively $p^2$ (50, 49), $p^3$ (0, 100), and $p^4$ (0, 61). $p^2$ (50, 49) is used to represent 49 bytes starting from a location of the $50^{th}$ byte in the second cache page, $p^3$ (0, 100) is used to represent 100 bytes starting from a location of the $0^{th}$ byte in the third cache page, and $p^4$ (0, 61) is used to represent 61 bytes starting from a location of the $0^{th}$ byte in the fourth cache page. It can be understood that, the object cache page to be accessed by the read request 700 may be one or more cache pages, that is, a value of M may be an integer not less than 1. For convenience of description, in this embodiment of the present disclosure, the determined M object cache pages and location information of the to-be-read data in the object cache page $OCP_j$ may be referred to as information 705 about the to-be-read data. As shown in FIG. 7, after the CPU 105 determines the information 705 about the to-be-read data, the CPU 105 may read, according to the determined information 705 about the to-be-read data, data cached in the DRAM 120.

In the embodiment shown in FIG. 8, after obtaining the location information of the to-be-read data in each object cache page OCP of the read request 700, the CPU 105 may perform the following operations on each object cache page $OCP_j$. It can be understood that, during actual application, when the CPU 105 determines, in step 810, that there is only one object cache page, the CPU 105 may perform the following operations only on the determined one object cache page. When the CPU 105 determines, in step 810, that there are multiple object cache pages, that is, when the CPU 105 determines, according to the read request 700, that the to-be-read data needs to be separately read from the multiple object cache pages, the CPU 105 may perform the following operations on each object cache page. For convenience of description, the following describes an operation method for one object cache page as an example.

In step 815, the CPU 105 determines whether the PCM 125 stores a log chain of the object cache page $OCP_j$. The log chain of the object cache page $OCP_j$ is used to record information about at least one log data chunk of the object cache page $OCP_j$. In this embodiment of the present disclosure, the log chain of the object cache page includes at least one data node, each data node includes information about one log data chunk, and each log data chunk is modified data of the object cache page in one modification process. When the PCM 125 stores no log chain of the object cache page OCP, the method goes to step 820, or when the PCM 125 stores the log chain structure of the object cache page $OCP_j$, the method goes to step 825. During application, after the CPU 105 determines, in step 810, the M object cache pages to be accessed by the read request 700, the CPU 105 may obtain cache page structures of the M object cache pages from metadata information of the object file, so as to determine, according to information recorded in the cache page structures, whether the PCM 125 stores a log chain structure of the object cache page OCP in the M object cache pages. For the cache page structure and the log chain structure, refer to FIG. 5. Descriptions of the cache page structure and a manner of how to determine, according to the cache page structure of the object cache page $OCP_j$, whether the PCM 125 stores a log chain of the object cache page $OCP_j$ are similar to those of step 320 in FIG. 3, and for details, refer to the description of step 320.

In step 820, the CPU 105 reads data of the object cache page $OCP_j$ from the DRAM according to the location information of the to-be-read data in the object cache page $OCP_j$. As described in step 320, for any object cache page, the CPU 105 can determine, according to a "log head" or a "log tail" in a cache page structure of the object cache page, whether the PCM 125 stores a log chain of the object cache page. When the CPU 105 determines, in step 815 according to the cache page structure of the object cache page $OCP_j$, that the PCM 125 stores no log chain of the object cache page $OCP_j$, it indicates that data of the object cache page $OCP_j$ has not been modified. Therefore, the CPU 105 can directly read the data in the object cache page OCP from the DRAM according to a location of the to-be-read data. As shown in FIG. 7, the CPU 105 may obtain read data 720 from a cache page in the DRAM 120.

In step 825, the CPU 105 obtains an updated object cache page $OCP_j'$ according to the object cache page $OCP_j$ and information that is about at least one log data chunk and that is in the log chain. When the CPU 105 determines, in step 815 according to the cache page structure of the object cache page $OCP_j$, that the PCM 125 stores the log chain of the object cache page $OCP_j$, it indicates that data of the object cache page $OCP_j$ has been modified. Therefore, the CPU 105 needs to update data in the log chain stored in the PCM 125 to the object cache page in the DRAM. Specifically, a log data chunk 215 in the log chain of the object cache page $OCP_j$ may be merged into the object cache page, to obtain the updated object cache page $OCP_j'$. In a data merging process, the CPU 105 determines valid data in the log chain of the object cache page $OCP_j$. In this embodiment of the present disclosure, the valid data is latest modified data of the cache page. After obtaining the valid data in the log chain of the object cache page $OCP_j$, the CPU 105 updates the valid data to the object cache page $OCP_j$, to obtain the updated object cache page $OCP_j'$. For a specific data merging method, refer to the description of FIG. 6.

In step 830, the CPU 105 reads data from the updated object cache page $OCP_j'$ according to the location information of the to-be-read data in the object cache page $OCP_j$. It can be understood that, the location information of the to-be-read data is a logical location of the to-be-read data in the object cache page. After the CPU 105 updates, in step 825, the object cache page $OCP_j$ according to the data in the log chain of the object cache page $OCP_j$ that is stored in the PCM 125, to obtain the updated object cache page $OCP_j'$, the CPU 105 can read the data from the updated object cache page $OCP_j'$ according to the location information, determined in step 810, of the to-be-read data in the object cache page $OCP_j$. For example, if it is determined in step 810 that the location information of the to-be-read data in the first cache page is the $15^{th}$ to $50^{th}$ bytes, in this step, the CPU 105 may read data of the $15^{th}$ to $50^{th}$ bytes from the updated first cache page. As shown in FIG. 7, the CPU 105 may obtain the read data 720 from the updated object cache page in the DRAM 120.

A person skilled in the art may know that, during actual application, when the DRAM 120 does not have the to-be-read data, the operating system first loads the to-be-read data from the magnetic disk into the DRAM 120, and then reads the data from the cache page in the DRAM, thereby increasing a reading speed.

It can be seen from the data reading process described in FIG. 8 that, in the access request processing method provided in this embodiment of the present disclosure, because modified data of the cache page is stored in the PCM 125 using a log chain, data modification at a granularity smaller than a page can be supported. When data in the cache page needs to be read, cache page data that is latest when data is read can be obtained according to a log data chunk in a data node in the log chain, thereby ensuring correctness of read data.

Figure 9:
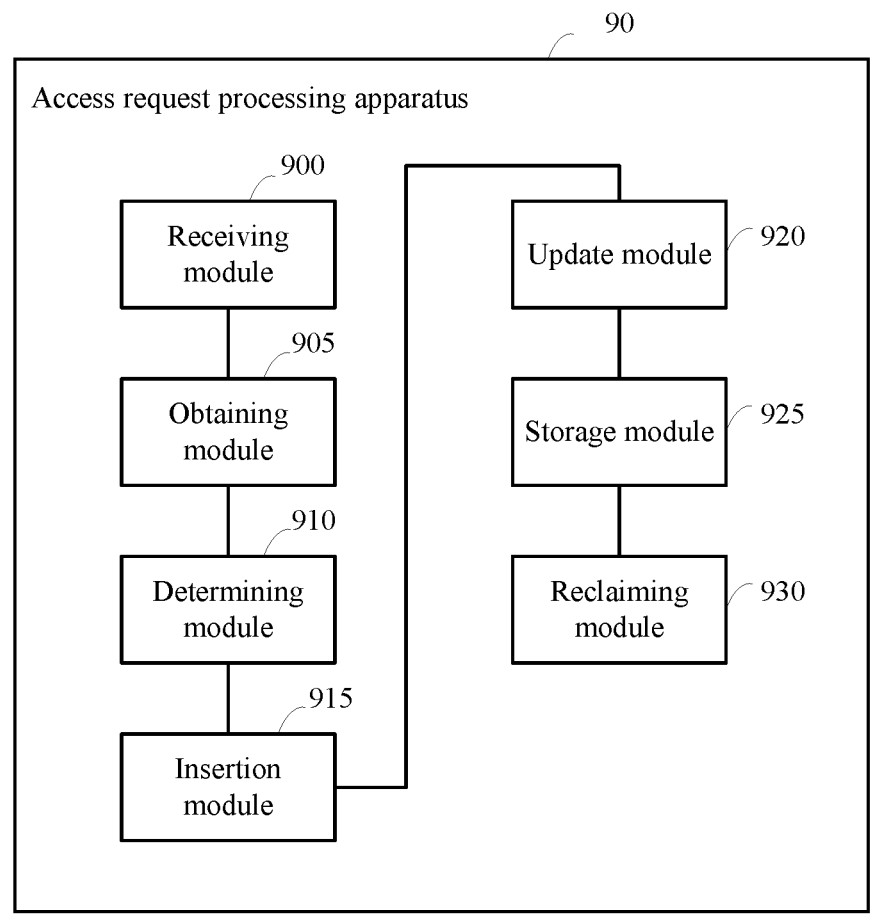
FIG. 9 is a schematic structural diagram of an access request processing apparatus according to an embodiment of the present disclosure.

FIG. 9 is a schematic structural diagram of an access request processing apparatus according to an embodiment of the present disclosure. The apparatus may be applied to a computer system including a non-volatile memory NVM. For example, the apparatus may be applied to the computer system shown in FIG. 1. As shown in FIG. 9, the access request processing apparatus 90 may include the following modules: a receiving module 900, an obtaining module 905, a determining module 910, and an insertion module 915.

The receiving module 900 is configured to receive a write request. The write request carries a file identifier, a buffer pointer, and a size of to-be-written data. The buffer pointer is used to point to a buffer for caching the to-be-written data, and the to-be-written data is modified data for an object file to be accessed by the write request.

The obtaining module 905 is configured to obtain an access location according to the file identifier. The access location indicates a start address for writing data to the object file by the write request.

The determining module 910 is configured to determine an object cache page according to the access location, the size of the to-be-written data, and a size of a cache page. The object cache page is a memory page that is in the memory and that is used to cache file data, to be modified by the to-be-written data, in the object file.

The determining module 910 is further configured to determine that the NVM stores a log chain (log chain) of the object cache page. The log chain of the object cache page includes at least one data node, and each data node includes information about modified data of the object cache page in one modification process.

The insertion module 915 is configured to insert a new data node into the log chain of the object cache page. The inserted data node includes information about a log data chunk of the object cache page. The log data chunk is modified data of the object cache page, and the log data chunk is at least one part of to-be-written data obtained from the buffer according to the buffer pointer. The information about the log data chunk includes the log data chunk or a storage address of the log data chunk in the NVM.

In this embodiment of the present disclosure, the information about the log data chunk further includes: an offset of the log data chunk in the object cache page, a length of the log data chunk, and address information of an adjacent data node of the inserted data node.

Specifically, in the process of performing the operation of inserting the new data node into the log chain of the object cache page by the insertion module 915, the insertion module 915 may specifically insert the new data node at a tail or a head of the log chain of the object cache page. After the new data node is inserted, the log chain of the object cache page includes at least two data nodes that are sequentially linked according to an update order of the object cache page.

During actual application, the access request processing apparatus 90 may further include an update module 920 and a storage module 925. The update module 920 is configured to obtain an updated object cache page according to information that is about at least one log data chunk and that is recorded in the log chain of the object cache page. The storage module 925 is configured to store data of the updated object cache page in an external storage device of the computer system. Specifically, the update module 920 may determine valid data in the log chain of the object cache page according to the information that is about the at least one log data chunk and that is recorded in the log chain of the object cache page, and update the valid data to the object cache page, to obtain the updated object cache page. The valid data is latest modified data of the object cache page.

Further, the access request processing apparatus 90 may further include a reclaiming module 930. The reclaiming module 930 is configured to reclaim the log chain of the object cache page after the data of the updated object cache page is stored in the external storage device of the computer system 100.

For the access request processing apparatus 90 provided in this embodiment of the present disclosure, refer to the access request processing method described in the foregoing embodiments. For detailed descriptions of functions of the modules, separately refer to the descriptions of FIG. 2 to FIG. 6 in the foregoing embodiments. Details are not described herein again.

Figure 10:
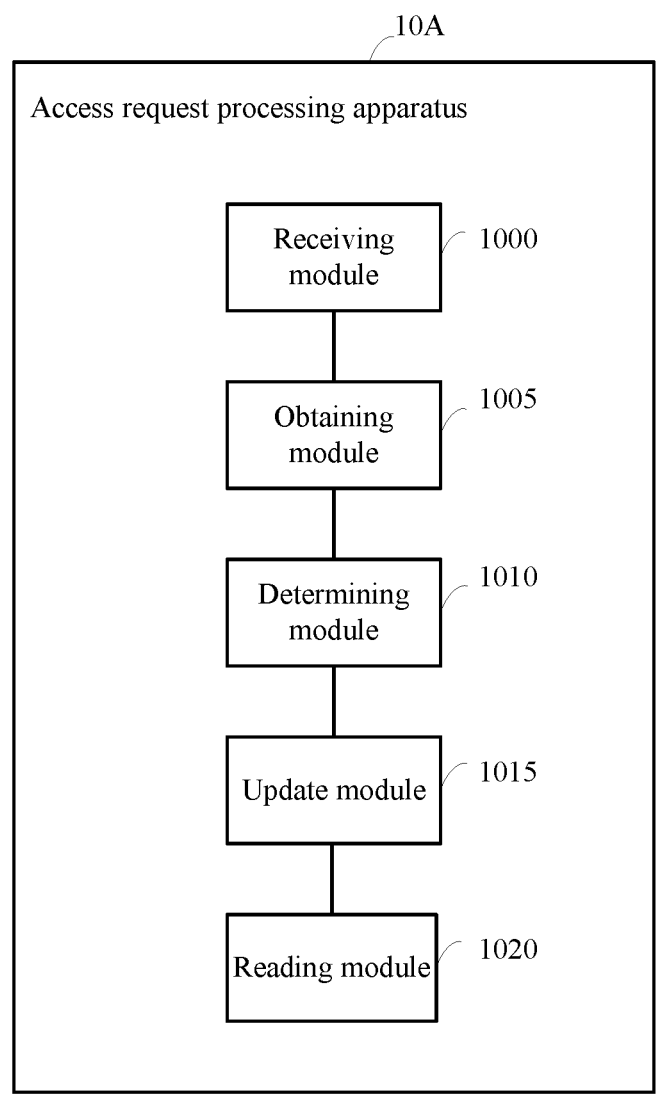
FIG. 10 is a schematic structural diagram of another access request processing apparatus according to an embodiment of the present disclosure.

FIG. 10 is a schematic structural diagram of an access request processing apparatus 10A according to an embodiment of the present disclosure. The apparatus may be applied to a computer system including a non-volatile memory NVM. For example, the apparatus may be applied to the computer system shown in FIG. 1. As shown in FIG. 10, the access request processing apparatus 10A may include the following modules.

A receiving module 1000 is configured to receive a read request. The read request carries a file identifier and a size of to-be-read data.

An obtaining module 1005 is configured to obtain an access location according to the file identifier. The access location indicates a start address for reading data from an object file by the read request.

A determining module 1010 is configured to determine, according to the access location, the size of the to-be-read data, and a size of a cache page, an object cache page and location information of the to-be-read data in the object cache page. The object cache page is a memory page that is in the memory and that is used to cache file data, to be modified by to-be-written data, in the object file.

The determining module 1010 is further configured to determine that the NVM stores a log chain of the object cache page. The log chain of the object cache page includes information about at least one log data chunk. Each log data chunk is modified data of the object cache page in one modification process. The information about the log data chunk includes the log data chunk or a storage address of the log data chunk in the NVM.

An update module 1015 is configured to obtain an updated object cache page according to the object cache page and the information that is about the at least one log data chunk and that is in the log chain of the object cache page. Specifically, the update module 1015 may determine valid data in the log chain of the object cache page according to the information that is about the at least one log data chunk and that is recorded in the log chain of the object cache page, and update the valid data to the object cache page, to obtain the updated object cache page. The valid data is latest modified data of the object cache page.

A reading module 1020 is configured to read data from the updated object cache page according to the location information of the to-be-read data in the object cache page.

In this embodiment of the present disclosure, the information about the log data chunk may further include: an offset of the log data chunk in the object cache page, a length of the log data chunk, and address information of an adjacent data node of a data node comprising the log data chunk. For specific descriptions of the log chain and the information about the log data chunk, refer to the foregoing embodiment.

For the apparatus 10A provided in this embodiment of the present disclosure, refer to the access request processing method described in the foregoing embodiments. Specifically, for detailed descriptions of functions of the modules, refer to descriptions of FIG. 7 and FIG. 8 in the foregoing embodiments. Details are not described herein again.

An embodiment of the present disclosure further provides a computer program product for implementing the access request processing method, including a computer readable storage medium storing program code. An instruction included in the program code is used to perform the method procedures described in any one of the foregoing method embodiments. A person of ordinary skill in the art can understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or another non-volatile memory.

It should be noted that, the embodiments provided in this application are only examples. A person skilled in the art may clearly know that, for convenience and conciseness of description, in the foregoing embodiments, the embodiments emphasize different aspects, and for a part not described in detail in one embodiment, refer to a related description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

What is claimed is:

1. An access request processing method performed by a computer device comprising a processor, a dynamic random-access memory (DRAM), and a non-volatile memory (NVM) providing a data caching function for the processor, the method comprising:
   receiving a write request, wherein the write request carries a file identifier identifying an object file, a buffer pointer, and a size of to-be-written data, the buffer pointer points to a buffer caching the to-be-written data, and the to-be-written data is to be written into the object file;
   obtaining access location information according to the file identifier, wherein the access location information indicates a write start location in the object file for the write request;
   identifying an object cache page according to the access location information, the size of the to-be-written data, and a cache page size, wherein the object cache page is located in the NVM or the DRAM and for caching file data in the object file, and the file data is to be modified by the to-be-written data, wherein the NVM stores data representing a log chain of the object cache page, the log chain comprises multiple data nodes, and each data node comprises information regarding a data chunk to be written into the object cache page in a corresponding modification event performed on the object cache page;
   obtaining the to-be-written data from the buffer according to the buffer pointer, the to-be-written data including a new data chunk to be written into the object cache page; and
   inserting a new data node into the log chain of the object cache page, the new data node comprising information regarding the new data chunk, wherein the information regarding the new data chunk comprises the new data chunk or a storage address of the new data chunk in the NVM.

2. The method according to claim 1, wherein the step of inserting the new data node into the log chain of the object cache page comprises:
   adding the new data node at a tail or a head of the log chain of the object cache page, wherein the data nodes in the log chain are arranged in a sequential order according to a time sequence of corresponding data modification events.

3. The method according to claim 1, further comprising:
    updating the object cache page to include the new data chunk and a second data chunk corresponding to a second data node in the log chain; and
    storing data of the updated object cache page into a storage device of the computer device.

4. The method according to claim 3, further comprising:
    removing data nodes in the log chain after storing the data of the updated object cache page into the storage device of the computer device.

5. The method according to claim 1, wherein the information regarding the data chunk of said each data node in the log chain further comprises: an offset of the data chunk in the object cache page, a length of the data chunk, and address information of an adjacent data node of said each data node.

6. An access request processing method performed by a computer device comprising a processor, a dynamic random-access memory (DRAM), and a non-volatile memory (NVM) providing a data caching function for the processor, the method comprising:
    receiving a read request, wherein the read request carries a file identifier identifying an object file and a size of to-be-read data;
    obtaining access location information according to the file identifier, wherein the access location information indicates a read start location in the object file for the read request;
    identifying an object cache page and location information of the to-be-read data in the object cache page according to the access location information, the size of the to-be-read data, and a cache page size, wherein the object cache page is located in the NVM or the DRAM and for caching file data in the object file, and the NVM stores data representing a log chain of the object cache page, the log chain of the object cache page comprises multiple data nodes, each data node comprises information regarding a data chunk to be written into the object cache page in a corresponding modification event performed on the object cache page, and the information regarding the data chunk of said each data node comprises the data chunk or a storage address of the data chunk in the NVM;
    updating the object cache page according to information regarding data chunks in multiple data nodes of the log chain of the object cache page; and
    reading data from the updated object cache page according to the location information of the to-be-read data in the object cache page.

7. The method according to claim 6, wherein the information regarding the data chunk of said each data node in the log chain further comprises: an offset of the data chunk in the object cache page, a length of the data chunk, and address information of an adjacent data node of said each data node.

8. A computer device, comprising:
    a dynamic random-access memory (DRAM),
    a non-volatile memory (NVM), and
    a processor connected to the DRAM and the NVM, the processor being configured to:
    receive a write request, wherein the write request carries a file identifier identifying an object file, a buffer pointer, and a size of to-be-written data, the buffer pointer points to a buffer caching the to-be-written data, and the to-be-written data is to be written into the object file;
    obtain access location information according to the file identifier, wherein the access location information indicates a write start location in the object file for the write request;
    identify an object cache page according to the access location information, the size of the to-be-written data, and a cache page size, wherein the object cache page is located in the NVM or the DRAM and for caching file data in the object file, the file data is to be modified by the to-be-written data, wherein the NVM stores data representing a log chain of the object cache page, the log chain comprises multiple data nodes, each data node comprising information regarding a data chunk to be written into the object cache page in a corresponding modification event performed on the object cache page;
    obtain the to-be-written data from the buffer according to the buffer pointer, the to-be-written data including a new data chunk to be written into the object cache page; and
    insert a new data node into the log chain of the object cache page, wherein the new data node comprises information regarding the new data chunk, and the information regarding the new data chunk comprises the new data chunk or a storage address of the new data chunk in the NVM.

9. The computer device according to claim 8, wherein the processor is configured to insert the new data node into the log chain by adding the new data node at a tail or a head of the log chain of the object cache page, wherein the data nodes in the log chain are arranged in a sequential order according to a time sequence of corresponding data modification events.

10. The computer device according to claim 9, wherein the processor is further configured to:
    update the object cache page to include the new data chunk and a second data chunk corresponding to a second data node in the log chain; and
    store data of the updated object cache page into a storage device of the computer device.

11. The computer device according to claim 10, wherein the processor is further configured to:
    remove data nodes in the log chain after storing the data of the updated object cache page into the storage device of the computer device.

12. The computer device according to claim 8, wherein the information regarding the data chunk of said each data node in the log chain comprises: an offset of the data chunk in the object cache page, a length of the data chunk, and address information of an adjacent data node of the said each data node.

13. The computer device according to claim 8, wherein the processor is further configured to:
    receive a read request, wherein the read request carries a file identifier identifying the object file and a size of to-be-read data;
    obtain access location information for the read request according to the file identifier in the read request, wherein the access location information for the read request indicates a read start location in the object file for the read request;
    identify the object cache page and location information of the to-be-read data in the object cache page according to the access location information for the read request, the size of the to-be-read data, and the cache page size;
    update the object cache page according to information regarding data chunks in multiple data nodes of the log chain of the object cache page; and read data from the updated object cache page according to the location information of the to-be-read data in the object cache page.

* * * * *